US012810060B2

(12) United States Patent
Dekkers et al.

(10) Patent No.: US 12,810,060 B2
(45) Date of Patent: Nov. 24, 2026

(54) VIRTUAL TEAM SPACES

(71) Applicant: Lucid Software, Inc., South Jordan, UT (US)

(72) Inventors: Caroline J. Dekkers, South Jordan, UT (US); Joseph Slinker, South Jordan, UT (US); Rob Witt, South Jordan, UT (US); Dan Ebeling, South Jordan, UT (US); Kellie Angerbauer, South Jordan, UT (US); Harrison Oyler, South Jordan, UT (US); John Dilworth, South Jordan, UT (US); John Harrison, South Jordan, UT (US); Austin Row, South Jordan, UT (US); John Nelson Ballard, South Jordan, UT (US); Jeff Barney, South Jordan, UT (US); Will Wang, South Jordan, UT (US)

(73) Assignee: LUCID SOFTWARE, INC., South Jordan, UT (US)

( * ) Notice: Subject to any disclaimer, the term of this patent is extended or adjusted under 35 U.S.C. 154(b) by 120 days.

(21) Appl. No.: 18/434,542

(22) Filed: Feb. 6, 2024

(65) Prior Publication Data

US 2024/0264733 A1 Aug. 8, 2024

Related U.S. Application Data

(60) Provisional application No. 63/483,942, filed on Feb. 8, 2023.

(51) Int. Cl.

| | |
|---|---|
| ***G06F 40/186*** | (2020.01) |
| ***G06F 3/0486*** | (2013.01) |
| ***G06F 40/106*** | (2020.01) |
| ***G06T 11/60*** | (2006.01) |

(Continued)

(52) U.S. Cl.

CPC .......... *G06F 40/186* (2020.01); *G06F 3/0486* (2013.01); *G06F 40/106* (2020.01); *G06T 11/60* (2013.01); *H04L 12/1818* (2013.01); *G06F 3/0482* (2013.01); *G06T 2200/24* (2013.01)

(58) Field of Classification Search

CPC .... H04L 65/403; G06Q 10/10; G06Q 10/101; G06Q 10/103

See application file for complete search history.

(56) References Cited

U.S. PATENT DOCUMENTS

| | | | | |
|---|---|---|---|---|
| 7,698,660 | B2 * | 4/2010 | Sanchez | G06F 9/451 715/753 |
| 10,063,660 | B1 * | 8/2018 | Coldham | G06F 16/178 |
| 10,467,593 | B2 * | 11/2019 | White | G06Q 10/10 |

(Continued)

OTHER PUBLICATIONS

PCT International Search Report and Written Opinion issued in corresponding application No. PCT/US2024/015034, dated May 28, 2024.

*Primary Examiner* — David R Lazaro
(74) *Attorney, Agent, or Firm* — Maschoff Brennan

(57) ABSTRACT

An example method to manage a virtual team space includes creating a new time period of a canvas-based space. Following and in response to creation of the new time period, the method may include persisting structure in the new time period of the canvas-based space; persisting relevant content in the new time period of the canvas-based space; and wiping non-relevant content from the new time period of the canvas-based space.

19 Claims, 10 Drawing Sheets

(51) Int. Cl.
*H04L 12/18* (2006.01)
*G06F 3/0482* (2013.01)

(56) References Cited

U.S. PATENT DOCUMENTS

| | | | | |
|---|---|---|---|---|
| 11,790,572 | B1 * | 10/2023 | Oulès | G06T 1/60 345/204 |
| 2009/0094537 | A1 * | 4/2009 | Alber | H04L 12/1827 715/758 |
| 2010/0191799 | A1 * | 7/2010 | Fiedorowicz | G06F 16/954 709/205 |
| 2010/0306018 | A1 * | 12/2010 | Burtner | G06Q 99/00 705/7.19 |
| 2011/0093805 | A1 * | 4/2011 | Ekhager | G06Q 10/10 715/769 |
| 2012/0109794 | A1 * | 5/2012 | Nathanson | G06Q 10/10 705/30 |
| 2013/0024452 | A1 * | 1/2013 | Defusco | G06Q 10/103 707/E17.089 |
| 2013/0311545 | A1 * | 11/2013 | Wright | G06Q 10/10 709/202 |
| 2014/0033009 | A1 | 1/2014 | Rein et al. | |
| 2014/0365918 | A1 * | 12/2014 | Caldwell | G06F 3/0481 715/753 |
| 2015/0085707 | A1 * | 3/2015 | Shi | H04L 12/1831 370/261 |
| 2015/0120577 | A1 | 4/2015 | Lobo et al. | |
| 2016/0283085 | A1 | 9/2016 | Beausoleil et al. | |
| 2017/0193412 | A1 * | 7/2017 | Easton | G06Q 10/06313 |
| 2017/0220235 | A1 * | 8/2017 | Jayaraman | H04N 5/44504 |
| 2017/0315728 | A1 * | 11/2017 | Zheng | G06F 3/0604 |
| 2018/0077092 | A1 | 3/2018 | Jalil | |
| 2018/0089625 | A1 | 3/2018 | Rosati et al. | |
| 2018/0285818 | A1 * | 10/2018 | Soltani | G06Q 10/101 |
| 2018/0292964 | A1 * | 10/2018 | Snyder | G06F 3/0488 |
| 2019/0026000 | A1 * | 1/2019 | Lipman | G06F 40/186 |
| 2021/0397585 | A1 * | 12/2021 | Seward | G06Q 10/40 |
| 2022/0165013 | A1 * | 5/2022 | Velez | G06F 3/011 |
| 2023/0251765 | A1 * | 8/2023 | Bull | G06F 16/9558 705/301 |
| 2023/0353611 | A1 * | 11/2023 | Mayfield | H04L 67/535 |
| 2024/0184989 | A1 * | 6/2024 | Mann | G06F 40/18 |
| 2024/0264733 | A1 * | 8/2024 | Dekkers | G06F 40/186 |

* cited by examiner

VIRTUAL TEAM SPACES

CROSS-REFERENCE TO RELATED APPLICATIONS

This application claims the benefit of U.S. patent application Ser. No. 63/483,942, filed on Feb. 8, 2023; the disclosure of which is incorporated herein by reference in its entirety.

FIELD

The embodiments discussed herein are related to virtual team spaces.

BACKGROUND

Unless otherwise indicated herein, the materials described herein are not prior art to the claims in the present application and are not admitted to be prior art by inclusion in this section.

Some online collaboration platforms are flexible, cloud-based environments that allow teams to communicate and collaborate in real time. Such platforms may provide an infinite scalable canvas and offer collaboration features like simultaneous editing, whiteboarding, diagramming, screen sharing, sticky notes, commenting, labeled cursors, text chat, and video and audio conferencing.

The subject matter claimed herein is not limited to implementations that solve any disadvantages or that operate only in environments such as those described above. Rather, this background is only provided to illustrate one example technology area where some implementations described herein may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

In an example embodiment, a method to manage a virtual team space includes creating a new time period of a canvas-based space. Following and in response to creation of the new time period, the method may include persisting structure in the new time period of the canvas-based space; persisting relevant content in the new time period of the canvas-based space; and wiping second content from the new time period of the canvas-based space.

In another example embodiment, a method to manage a virtual team space includes opening a template that includes at least first and second container graphical objects in a canvas-based space. The method includes receiving first input to designate the first container graphical object as a container of content to be persisted in the canvas-based space. The method includes receiving second input to designate the second container graphical object as a container of content to be refreshed in the canvas-based space. The method includes receiving third input to create a new time period of the canvas-based space. In response to creation of the new time period, the method may include persisting structure including the first and second container graphical objects in the new time period of the canvas-based space; persisting, in the new time period of the canvas-based space, all content within the first container graphical object based on the designation of the first container graphical object as a container of content to be persisted; and wiping all undesignated content within the second container graphical object from the new time period of the canvas-based space.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

Figure 1:
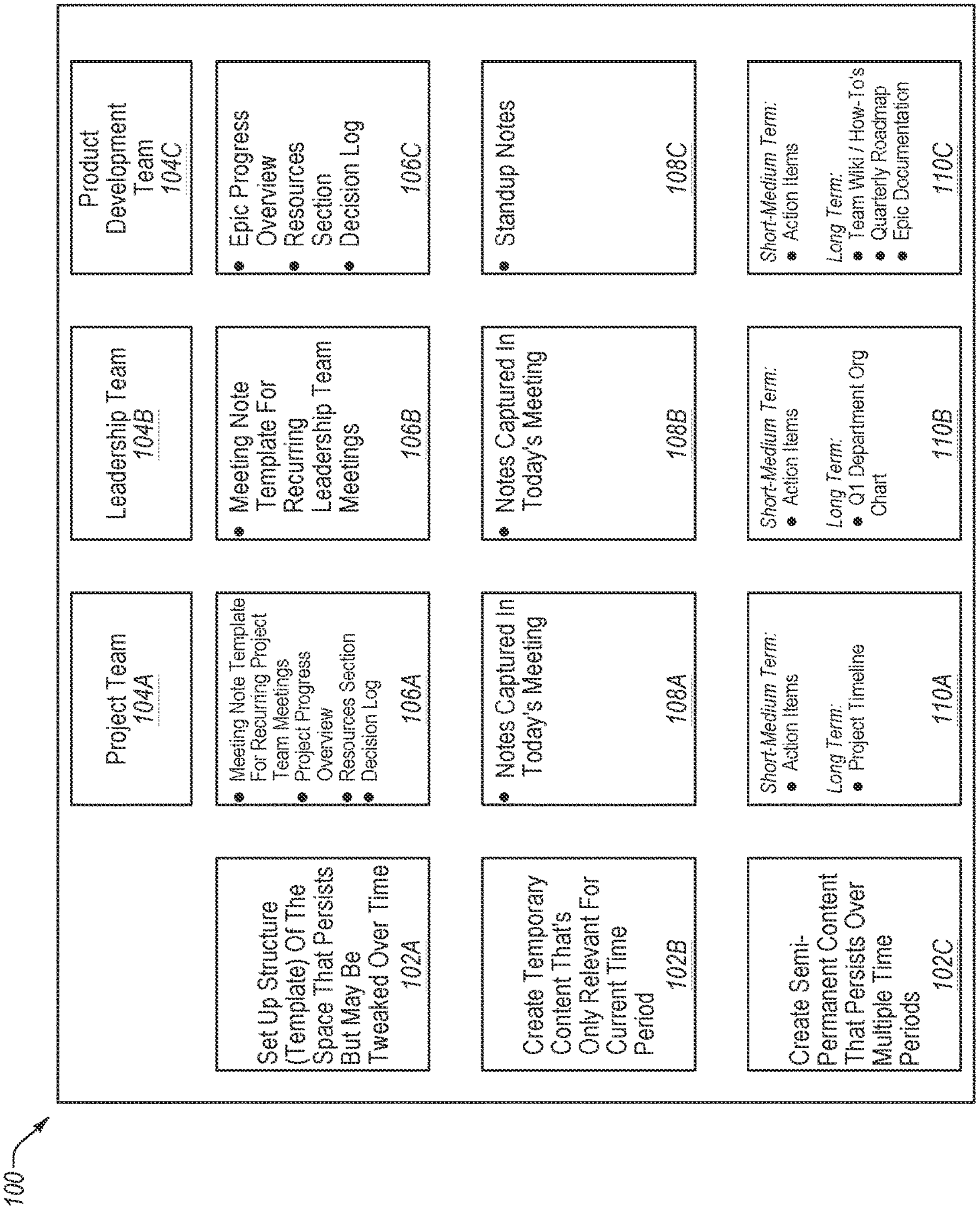
FIG. 1 illustrates a table of three example scenarios that may be relevant to three example types of teams in a virtual team space.

Virtual team spaces allow users to work together remotely as a team. Some teams may benefit from having a virtual home base that may bring together the knowledge and context the team needs. Depending on the goals of the team, it may be desirable to persist the virtual home base, or more generally a virtual team space, over long periods of time during which the virtual team space may be referenced regularly by the team. Embodiments herein may provide such virtual team spaces for use by any type of team, as a 1:1 space, a personal space, or any other space where information may be persisted and/or evolve over time and it may be useful to tie everything together in a central space (e.g., home base or knowledge hub) to reduce the mental tax of searching for information across various tools and locations.

Example types of teams include project teams, leadership teams, product development teams. A project team typically has a goal of bringing a new product or feature to market. Typical characteristics of a project team include finite start and end dates based on a project timeline and coordination cadence of the team being streamlined around a single recurring ritual (such as a weekly meeting). A leadership team typically has a goal of entity-wide high-level planning and goal setting. Typical characteristics of a leadership team include an ongoing nature (i.e., no finite end date) and coordination cadence of the team being streamlined around a single recurring ritual (such as a weekly meeting). A product development team typically has a goal of building or implementing new products or features. Typical characteristics of a product development team include an ongoing nature (i.e., no finite end date) and coordination happening across various rituals on different cadences.

In more detail, the content and/or structure of the virtual team space of a project team may include one or more of the following characteristics. Some content may be static and may not change much or at all over time, such as a team roster, team resources, and a project timeline. The team may desire easy and recurring access to such content. Some content may be ritualistically recurring content that is relevant for different time periods, such as weekly meeting notes and sprint planning. The team may desire a consistent structure for such recurring content over time (e.g., the same section or container where the current recurring content may be found) with the ability to track changes to the recurring content and/or to easily access past recurring content that is relevant to a previous period. Some content may be ad hoc content that is relevant for one or more different time periods, such as decisions or action items. Similar to ritualistically recurring content, the team may desire a consistent structure for such ad hoc content over time (e.g., the same section or container where the current ad hoc content may be found) with the ability to track changes to the content and/or to easily access past ad hoc content that is relevant to a previous period. Some content may be ritualistically recurring content that is independent for each instance, such as solutioning, estimation, and retrospectives. The team may desire a consistent structure for such recurring content over time (e.g., the same section or container where the current recurring content may be found). Some content may be ad hoc content that is independent for each instance, such as announcements and general team updates. Similar to ritualistically recurring content that is independent for each instance, the team may desire a consistent structure for such ad hoc content over time (e.g., the same section or container where the current ad hoc content may be found). Thus, in a virtual team space for a team, some content may be static and useful to the team on an ongoing basis, some non-static content may generally be refreshed on the same cadence (e.g., weekly), and some non-static content may be refreshed ad hoc or outside of the regular cadence, but is also likely reviewed in line with the established cadence.

FIG. 1 illustrates a table 100 of three example scenarios 102A-102C that may be relevant to three example types of teams 104A-104C in a virtual team space, arranged in accordance with at least one embodiment described herein. The virtual team space may include any of the virtual team spaces herein. The types of teams 104A-104C include a project team 104A, a leadership team 104B, and a product development team 104C.

In the scenario 102A, a team may set up structure of the virtual team space that should generally persist in time across versions of the virtual team space, but which may be modified over time. The versions of the virtual team space may correspond to different periods of time and may be referred to as time periods of the virtual team space. The terms "version" and "time period" may be used interchangeably herein. Examples 106A of structure that may persist across time periods of the virtual team space and that may be set up by the project team 104A include a meeting note template, section, or container for recurring project team meetings where the project team can add sticky notes (e.g., during meetings), a project progress overview section or container where progress of the team's project may be shown, a resources section or container that includes resources that the project team may be likely to access or use on a recurring basis during the project, and/or a decision log section or container where decisions made (and/or to be made) by the project team may be shown. An example 106B of such structure that may be set up by the leadership team 104B includes a meeting note template, section, or container for recurring leadership team meetings where the leadership team can add sticky notes (e.g., during meetings). Examples 106C of such structure that may be set up by the product development team 104C include an epic progress overview section or container where progress of the product development team on a large chunk of work (that may be segmented into smaller tasks) may be shown, a resources section or container that includes resources that the product development team is likely to access or use on a recurring basis during the product development, and/or a decision log section or container where decisions made (and/or to be made) by the product development team may be shown.

In the scenario 102B, a team may create temporary content in the virtual team space that is only relevant for a current time period. Examples 108A, 108B of such temporary content that may be created by the project team 104A and the leadership team 104B include meeting notes (e.g., that may be captured in the meeting template of the virtual team space as sticky notes). Examples 108C of such temporary content that may be created by the product development team 104C include standup notes (e.g., that may be captured in the epic progress overview section (or other section or container) of the virtual team space as sticky notes).

In the scenario 102C, a team may create semi-permanent content in the virtual team space that the team would like to persist over multiple time periods. Examples 110A of such semi-permanent content that may be created by the project team 104A include short- and/or medium-term content such as action items (e.g., in the form of action item graphical objects) or tasks (e.g., in the form of task graphical objects) and/or long-term content such as a project timeline. Examples 110B of such semi-permanent content that may be created by the leadership team 104B include short- and/or medium-term content such as action items or tasks and/or long-term content such as a quarterly department org chart. Examples 110C of such semi-permanent content that may be created by the product development team 104C include short- and/or medium-term content such as action items or tasks and/or long-term content such as a team wiki, a quarterly roadmap, and/or epic documentation.

Many applications use templates to address the scenario 102A. Some embodiments herein may similarly use templates to address the scenario 102A. In addition, some embodiments herein conveniently maintain in a virtual team space over time semi-permanent content such as that in scenario 102C while removing temporary content such as that in scenario 102B that may be relevant for a time period (e.g., when created) but may become irrelevant after the time period. Alternatively or additionally, some embodiments herein may implement versioning in which time periods of the virtual team space are created (e.g., according to the regular cadence of the team) so that the temporary content may still be accessed in the future. Alternatively or additionally, some embodiments herein may track changes of at least a current version of the virtual team space so that the team may review and/or potentially undo changes made to the virtual team space.

Reference will now be made to the drawings to describe various aspects of example embodiments of the invention. It is to be understood that the drawings are diagrammatic and schematic representations of such example embodiments, and are not limiting of the present invention, nor are they necessarily drawn to scale.

Figure 2:
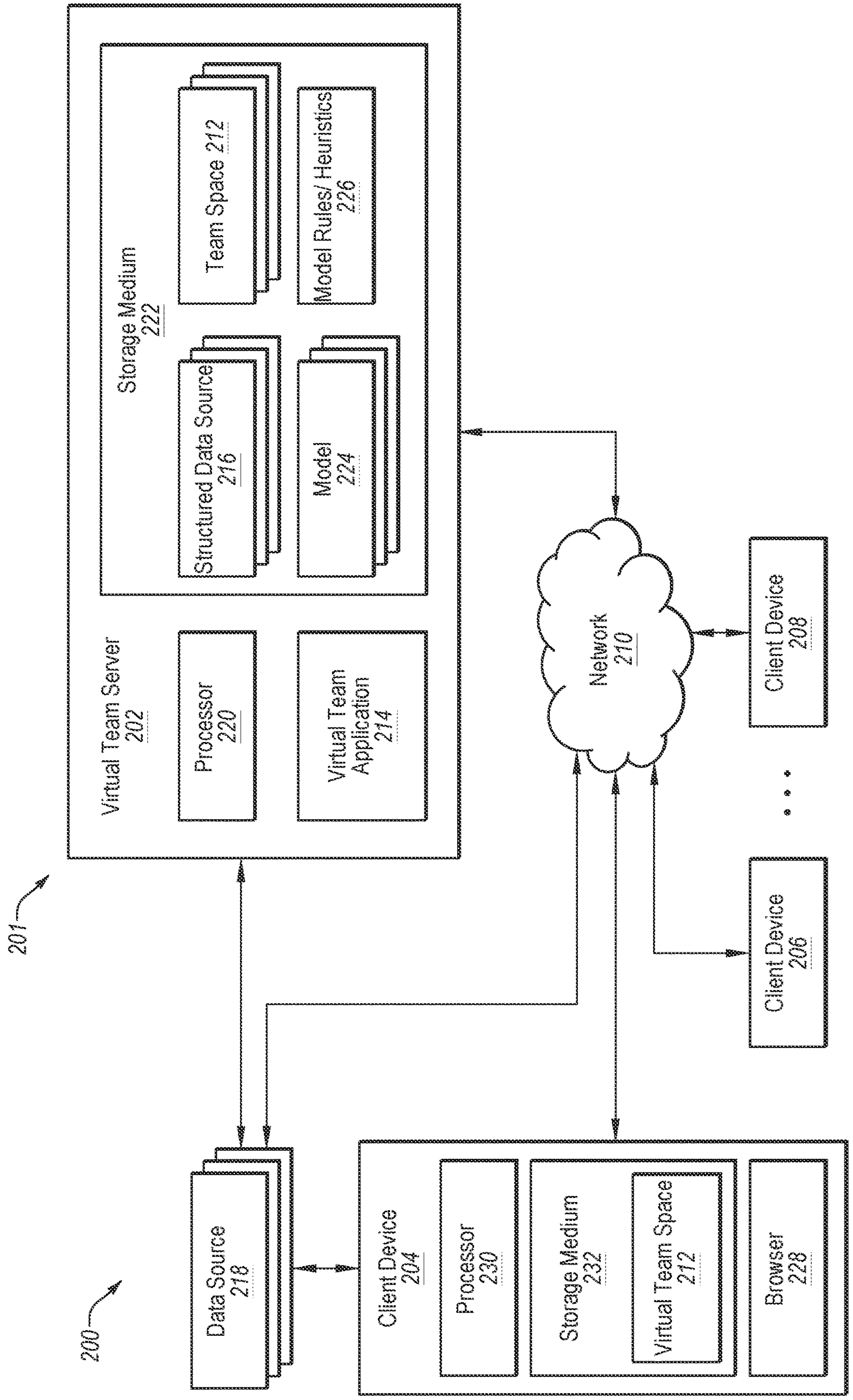
FIG. 2 is a block diagram of an example operating environment for a virtual team spaces platform.

FIG. 2 is a block diagram of an example operating environment 200 for virtual team spaces platform 101, arranged in accordance with at least one embodiment described herein. The environment 200 includes a virtual team server (hereinafter "server") 202, one or more client devices 204, 206, 208, and a network 210.

In general, the network 210 may include one or more wide area networks (WANs) and/or local area networks (LANs) that enable the server 202 and the client devices 204, 206, 208, to communicate with each other. In some embodiments, the network 210 may include the Internet, including a global internetwork formed by logical and physical connections between multiple WANs and/or LANs. Alternately or additionally, the network 210 may include one or more cellular radio frequency (RF) networks and/or one or more wired and/or wireless networks such as 802.xx networks, Bluetooth access points, wireless access points, Internet Protocol (IP)-based networks, or other wired and/or wireless networks. The network 210 may also include servers that enable one type of network to interface with another type of network.

In some embodiments, the server 202 and/or the client devices 204, 206, 208 may be configured to allow users, e.g., users of the client devices 204, 206, 208, to communicate and collaborate online in real time. For example, the server 202 may generally host virtual team spaces 212, each of which may be accessed by one or multiple users simultaneously or asynchronously via client devices 204, 206, 208. Within the virtual team spaces 212, users may generate graphical diagrams or visualizations with graphical objects or content authored by users, embed other documents, import content from external applications, or the like, via a virtual team application 214 hosted by the server 202. As an example, the virtual team application 214 may incorporate functionality of or include a virtual whiteboard application such as LUCIDSPARK, MURAL, MIRO, CONCEPTBOARD, ZITEBOARD, MICROSOFT WHITEBOARD, or other virtual whiteboard application, of a diagramming application such as LUCIDCHART, CREATELY, SMARTDRAW, VISIO, or other diagramming application, and/or of other applications.

When multiple client devices 204, 206, 208 are simultaneously accessing the same virtual team space 212, the virtual team application 214 may show graphical objects or other content added, moved, or otherwise modified by a given user to other users. A virtual team space as used herein may refer to a document or other file that includes graphical objects or other content or structure generated, formatted, and/or grouped by users on a graphical drawing canvas. Such documents or other files may be referred to as canvas-based spaces. Alternatively or additionally, a virtual team space may include data collections and/or pointers to data collections used to generate, format, or group graphical objects.

Graphical objects generated within the virtual team spaces 212 may be simple graphical objects or data-backed graphical objects. Simple graphical objects may be stored within virtual team spaces 212 with various graphical attributes, such as shape, size, outline color, fill color, or other graphical attributes. Data-backed graphical objects may be explicitly stored as and/or represented by data collections in structured source data 216. Each data-backed graphical object may have a corresponding data collection in a set of structured source data 216 that explicitly identifies attributes of the graphical object, such as graphical attributes (e.g., fill color, outline color, shape) as well as other attributes such as an author of the graphical object, a tag applied to the graphical object, text of or in the graphical object, or other attribute(s).

Users may generate container graphical objects (hereinafter "containers") within the virtual team spaces 212, e.g., to organize other graphical objects. Containers may be simple containers or data-backed containers. Containers may organize or group of simple or data-backed graphical objects based on some attribute of the graphical objects. For example, within a single data-backed container, graphical objects may be organized in columns or tabs based on an attribute of the graphical objects. As another example, graphical objects may be grouped into different simple or data-backed containers based on an attribute of the graphical objects. Simple containers may have no responsiveness or less responsiveness to attribute changes of graphical objects than data-backed containers. In some embodiments, a given simple container may be unable to organize graphical objects within the simple container in columns or tabs.

Simple containers and data-backed containers may behave similarly or differently. For example, data-backed containers may automatically resize to accommodate the addition or removal of a graphical object, whereas simple containers may not, e.g., simple containers may require manual resizing. Alternatively or additionally, a graphical object may be automatically removed from or added to a simple or data-backed container when a corresponding change to a corresponding attribute of the graphical object is made. Alternatively or additionally, a graphical object may be automatically removed from or added to a column or tab within a data-backed container when a corresponding change to a corresponding attribute of the graphical object is made.

Containers are examples of structural elements that may be included in a virtual team space 212. Containers or other structural elements may be manually added to a virtual team space 212 by users manually creating and placing each container or structural element at a desired location on the canvas of the virtual team space 212. In some embodiments, containers or other structural elements may be automatically or semi-automatically added to a virtual team space 212 by users. For example, users may select a virtual team space template from a list of available templates within the virtual team application 214 to automatically populate the virtual team space 212 with containers or other structural elements arranged and configured as specified by the template. As another example, the user may select and/or position multiple different templates to have containers or other structural elements of each of the templates populated at different locations within the virtual team space 212.

Virtual team spaces 212 generated by the virtual team application 214 may be exported to other systems or applications. In some embodiments, a virtual team space 212 may be exported along with its corresponding structured source data to another application.

In some embodiments, virtual team spaces 212 may have or be a first file type and documents or templates of other file types may be embedded in any given one of the virtual team spaces 212. For example, one or more documents having a diagramming application file type or virtual whiteboard application file type may be embedded in the virtual team space 212 which may have a different file type. In these and other embodiments, the virtual team application 214 may open and/or execute a corresponding application when an embedded document is accessed or edited within the virtual team space 212.

In some embodiments, the virtual team application 214 may generate graphical diagrams or visualizations within the virtual team spaces 212 from structured source data of one or more data sources 218. In this and other examples, some of the sets of structured source data 216 may represent or be derived from corresponding ones of the data sources 218. Additional details regarding graphical diagrams or visualizations generated based on structured source data are disclosed in the following U.S. patent documents which are incorporated herein by reference in their entireties: U.S. Pat. Nos. 10,860,602, 10,860,603, U.S. patent Pub. No. 10200A004872 (U.S. application Ser. No. 16/024,551, filed Jun. 29, 2018), and U.S. Pat. No. 11,144,516.

Although one server 202 and three client devices 204, 206, 208 are illustrated in FIG. 2, the environment 200 may more generally include one or more servers 202 and one or more client devices 204, 206, 208. In these and other embodiments, the environment 200 may include other servers and/or devices not illustrated in FIG. 2.

In general, the server 202 may host the virtual team application 214 that allows the client devices 204, 206, 208 to collaborate online, including, e.g., persisting over time some content to be used on an ongoing basis by members of a team within a given virtual team space 212, persisting structure (e.g., containers or other structure elements of a template) within the virtual team space 212, wiping other content generally only considered relevant for a limited time from the virtual team space 212, and/or other features or functionality described herein. Alternatively or additionally, the virtual team application 214 may e.g., reflect changes made to the virtual team space 212 at one of the client devices 204, 206, 208 to the others of the client devices 204, 206, 208 and/or may implement one or more aspects of U.S. patent Pub. No. 2022/0108276 which is incorporated herein by reference in its entirety. Alternatively or additionally, the virtual team application 214 may facilitate offline collaboration and/or may implement one or more aspects of U.S. Pat. No. 9,087,113 which is incorporated herein by reference in its entirety.

When users work together as part of a team, some content may be created, accessed, and/or referenced by the team on an ongoing basis while other content may only be relevant for a limited time. Accordingly, in some embodiments, the virtual team application 214 may generally facilitate creation of a virtual bullpen in the virtual team space 212 for a team of users, e.g., a virtual home base that may bring together the knowledge and context the team needs to initiate work, coordinate on progress, and stay aligned from start to finish. The knowledge and context, or more generally data, may include meeting notes, meeting agendas, resources, timelines, schedules, documents, action items, assignments, etc. The virtual team application 214 may retain some of the data in the virtual team space 212 permanently or semi-permanently while other data may be wiped, or deleted, periodically, from time to time, or ad hoc. Accordingly, in some embodiments, the virtual team application 214 may apply versioning to the virtual team space 212 in which only relevant or desired data is maintained in a current version of the virtual team space 212 and data that may have been relevant at one time but is no longer relevant may be wiped. By versioning the virtual team space 212, historic states or time periods of the virtual team space 212 with data that is no longer present in the current version may still be accessed in any of the accessible historic states or time periods of the virtual team space 212 while keeping the current version or time period of the virtual team space 212 free from data that is no longer relevant.

One or more time periods (up to all of the time periods) of the virtual team space 212 may be locked against editing or may have otherwise limited functionality. Alternatively or additionally, one or more time periods (up to all of the time periods) of the virtual team space 212 may be editable.

In some embodiments, each time period of the virtual team space 212 may be created at the end of the corresponding period of time. A current version or current time period of the virtual team space 212 may temporarily cover an incomplete period of time, e.g., a current period of time that begins at the end of an immediately prior period of time and has not yet ended. Once the current period of time ends, the current time period of the virtual team space 212 becomes a prior time period of the virtual team space 212 and a new current time period of the virtual team space 212 begins.

In more detail, in some embodiments, the virtual team application 214 may persist structure across time periods of the virtual team space 212. The structure may include containers and/or other structural elements that impart a desired structural organization or arrangement to the virtual team space 212. The structure may be created in the virtual team space 212 by a user, e.g., manually piece-by-piece, in response to selection of a desired template (or multiple templates) from a set of available templates, or in some other manner. By persisting structure across time periods of the virtual team space 212, users may easily navigate in the current time period (or in a prior time period) to desired containers or other sections that remain in the same location across time periods of the virtual team space 212 (unless the containers or other sections are moved or deleted by a user prior to creation of a most recent prior time period).

In some embodiments, structure in a virtual team space, such as containers, may have, at any given time, one of the following states relating to persistence. First, a given structure may be persistent, meaning both the structure and content within the structure may persist across time periods. Second, the structure may be refreshable, meaning the structure may persist across time periods while content within the structure may be refreshed, e.g., wiped, every time a new time period is created. Third, the structure may be non-persistent, meaning neither the structure nor content within the structure may persist across time periods, e.g., the structure and content within the structure may be wiped when a new time period is created. A container (or other structure) may be designated as a persistent container, a refreshable container, or a non-persistent container in any suitable manner. For instance, a container may be selected (e.g., via right click, left click, or in some other manner), in response to which a popup menu, a contextual formatting menu bar, or other interface may be displayed that includes a first button (e.g., a persist button), a second button (e.g., a refresh button), and/or a third button (e.g., a wipe button). Selection of the first button may designate the container as a persistent container, selection of the second button may designate the container as a refreshable container, and selection of the third button may designate the container as a non-persistent container. Alternatively, the container may have a default state or designation of non-persistent which may be changed to persistent or refreshable through a user interface (e.g., popup menu, contextual formatting menu bar, etc.) or in some other manner. As another example, the popup menu, contextual formatting menu bar, or other interface displayed in connection with selection (e.g., right click, left click, or other selection) of the container may include a radio button with mutually exclusive options corresponding to two or more of persistent, refreshable, and/or non-persistent, and the option next to the desired state may be selected in the interface to designate the container as a corresponding one of persistent, refreshable, or non-persistent.

Alternatively or additionally, non-structure content, such as shapes, embedded files, images, and other graphical objects in a virtual team space may have, at any given time, one of the following states relating to persistence. First, a given content may be persistent, meaning the content and any other content therein may persist across time periods. For example, a persistent shape graphical object including its formatting and any text therein may persist across time periods. Second, the content may be refreshable, meaning the content may persist across time periods while other content therein may be refreshed, e.g., wiped, every time a new time period is created. For example, a refreshable shape graphical object (including its formatting) may persist across time periods while text therein may be wiped every time a new time period is created. Third, the content may be non-persistent, meaning neither the content nor other content therein may persist across time periods, e.g., the content and other content therein may be wiped when a new time period is created. Content may be designated as persistent, refreshable, or non-persistent individually or as part of a group. For example, content may be individually designated as persistent, refreshable, or non-persistent in the same or similar manner as containers or other structure as described herein. In some embodiments, content may be collectively designated as a persistent group of content to be persisted by designating a container (or other structure) within a virtual team space and within which the group of content is located as a persistent container as described herein. Content that is not designated as persistent or refreshable (either individually or as part of a group) as content to be persisted may default to non-persistent and may be wiped from the virtual team space 212 following and/or in response to creation of a new time period of the virtual team space 212. In some embodiments, content may be collectively designated as a non-persistent group of content by designating a container (or other structure) within the virtual team space and within which the group of content is located as a container to be refreshed.

In some embodiments, a user interface of the virtual team application 214 may include a team roster that identifies all users that are part of a given team. The users may be identified by or with a corresponding name, username, avatar, photograph, or other representation of the user in the team roster. A given user may be assigned to or associated with a given task or other content by dragging and dropping a corresponding user icon (e.g., avatar, photograph, or other representation of the user) from the team roster to the task or other content. The virtual team application 214 may implement or enable any other feature or functionality as described herein.

The server 202 may additionally include a processor 220 and a storage medium 222. The processor 220 may be of any type such as a central processing unit (CPU), a microprocessor (μP), a microcontroller (μC), a digital signal processor (DSP), or any combination thereof. The processor 220 may be configured to execute computer instructions that, when executed, cause the processor 220 to perform or control performance of one or more of the operations described herein with respect to the server 202.

The storage medium 222 may include any non-transitory computer-readable medium, including volatile memory such as random access memory (RAM), persistent or non-volatile storage such as read only memory (ROM), electrically erasable and programmable ROM (EEPROM), compact disc-ROM (CD-ROM) or other optical disk storage, magnetic disk storage or other magnetic storage device, NAND flash memory or other solid state storage device, or other persistent or non-volatile computer storage medium. The storage medium 222 may store computer instructions that may be executed by the processor 220 to perform or control performance of one or more of the operations described herein.

The storage medium 222 may additionally store the sets of structured source data 216, virtual team spaces 212, one or more models 224, and/or model rules and/or heuristics 226 ("Model Rules/Heuristics" in FIG. 2). Each set of structured source data 216 may be generated for the data-backed graphical objects and containers in a given virtual team space 212 and/or may be imported from a corresponding one of the data sources 218. The structured source data 220 may be imported over the network 210 or directly from the corresponding data source 218 if a direct connection exists.

The model rules and/or heuristics 226 include rules and/or heuristics that may be applied to the structured source data 216 to derive information about nodes and/or their relationships represented in the structured source data 216. The structured source data 216 and/or the information derived by the model rules and/or heuristics 226 may be used by the server 202 to generate the models 224, each model 224 corresponding to a different set of structured source data 216. Graphical diagrams within the virtual team spaces 212 may be generated directly from a corresponding set of the structured source data 216 and/or from a corresponding one of the models 224 derived from the corresponding set of structured source data 216.

Each of the client devices 204, 206, 208 may execute an application, such as a browser 228, configured to communicate through the network 210 with the server 202. The browser 228 may include an Internet browser or other suitable application to communicate through the network 210 with the server 202. The browser 228 may generate, download and/or interact with virtual team spaces 212, structured source data 216, and/or graphical diagrams within the virtual team spaces 212. Each of the client devices 204, 206, 208 may include a desktop computer, a laptop computer, a tablet computer, a mobile phone, a smartphone, a personal digital assistant (PDA), a wearable device (e.g., a smart watch), an interactive whiteboard (e.g., SURFACE HUB), or another suitable client device.

Each of the client devices 204, 206, 208 may additionally include a processor and a storage medium, such as a processor 230 and a storage medium 232 as illustrated for the client device 204 in FIG. 2. Each of the other client devices 206, 208 may be similarly configured. Similar to the processor 220 of the server 202, the processor 230 may be of any type such as a CPU, a μP, a μC, a DSP, or any combination thereof. The processor 230 may be configured to execute computer instructions that, when executed, cause the processor 230 to perform or control performance of one or more of the operations described herein.

Similar to the storage medium 222 of the server 202, the storage medium 232 of the client device 204 may include any non-transitory computer-readable medium, including volatile memory such as RAM, persistent or non-volatile storage such as ROM, EEPROM, CD-ROM or other optical disk storage, magnetic disk storage or other magnetic storage device, NAND flash memory or other solid state storage device, or other persistent or non-volatile computer storage medium. The storage medium 232 may store computer instructions that may be executed by the processor 230 to perform one or more of the operations described herein. The storage medium 232 may additionally store, at least temporarily, a virtual team space 212, some of a corresponding set of structured source data 216 or model 224, and/or other content obtained from the server 202 and/or generated locally on the client device 204.

Embodiments described herein are not limited to using a browser to communicate with the server 202 to collaborate online with other users. For example, rather than or in addition to a browser, the client devices 204, 206, 208 may include a native app as are often used on client devices such as mobile devices including smartphones, tablet computers, and interactive whiteboards. Accordingly, embodiments described herein generally include collaborating online using a browser, a native app, or another suitable application on the client devices 204, 206, 208.

Figure 3A:
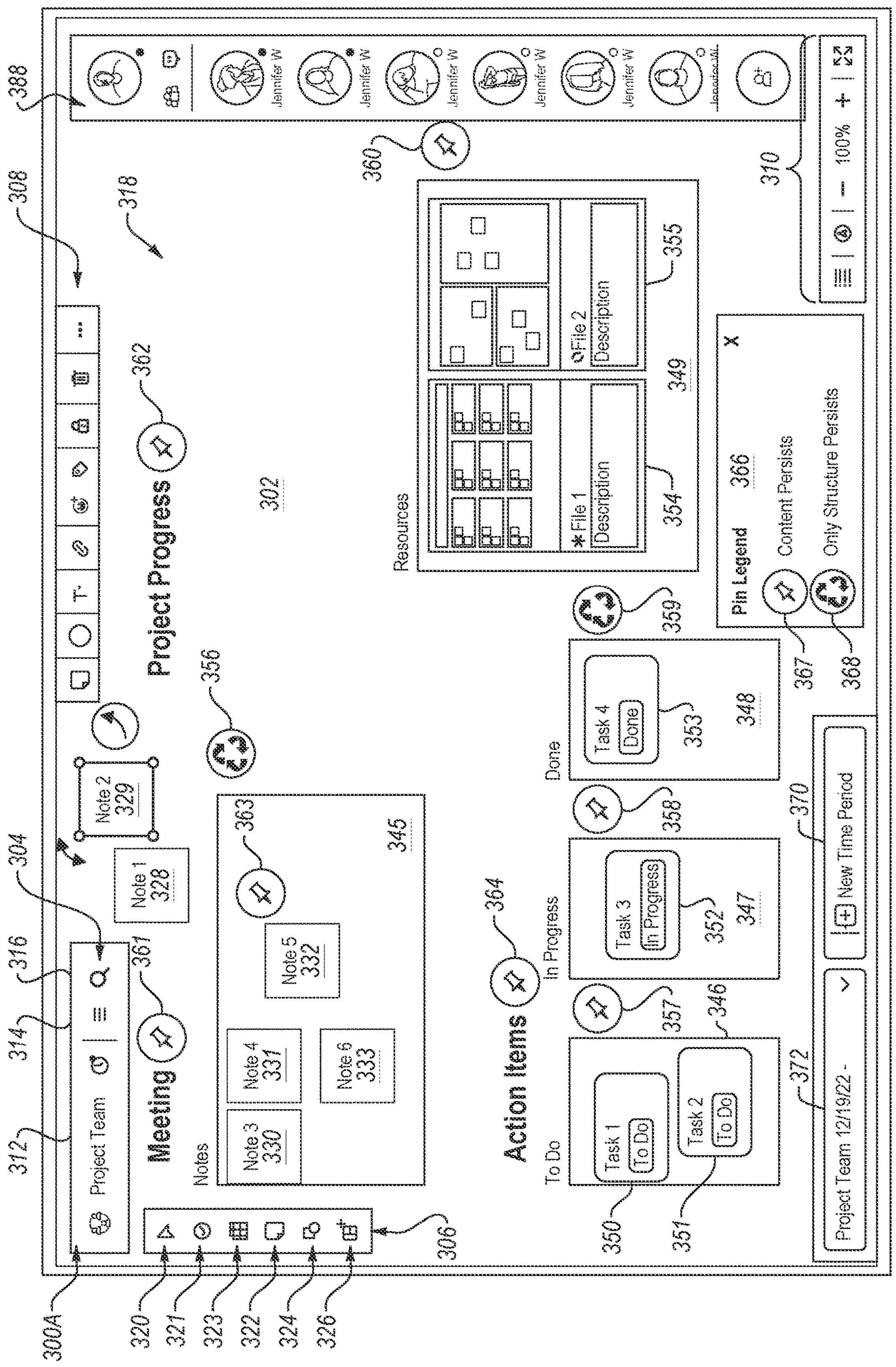
FIG. 3A includes a graphical representation of an example UI for virtual collaboration.

FIG. 3A includes a graphical representation 300A of an example UI for virtual collaboration, arranged in accordance with at least one embodiment described herein. The UI may be provided by the browser 228 and/or the virtual team application 214 of FIG. 2. For instance, the browser 228 in cooperation with the virtual team application 214 may present the UI of FIG. 3A to a user through and/or on a display of the client device 204.

In FIG. 3A, the graphical representation 300A includes a graphical drawing canvas 302 (hereinafter "canvas 302") and various menu bars 304, 306, 308, 310. Each of the menu bars 304, 306, 308, 310 may be fixed or movable within or around the canvas 302. Alternatively or additionally, the UI may present one or more contextual formatting bars when a given graphical object has been selected or is being edited. The menu bar 308 is an example of a contextual formatting menu bar for a sticky note. More generally, embodiments described herein include graphical drawing canvases with one or more menu bars (or other menu arrangements or interfaces) that are fixed or movable within or around the graphical drawing canvases, where the one or more menu bars (or other menu arrangement) include one or more of the menu options described with respect to the menu bars 304, 306, 308, 310 or other menu bars herein.

The menu bar 304 includes a virtual team space filename field 312 (hereinafter "field 312"), an additional options button 314, and a search field 316. The field 312 may display a filename of a virtual team space 318 currently displayed in the canvas 302. Alternatively or additionally, a user may select the icon to the left of the field 312 (or provide other suitable input) to navigate a file system to open a different virtual team space.

The additional options button 314 may be selected by the user to access additional options.

Within the search field 316, the user may enter text to search the virtual team space 318 for matching text. In response to entry of text in the search field 316, the virtual team application 214 may search for the text in the current time period of the virtual team space 318, in one or more prior time periods of the virtual team space 318, in content embedded anywhere in the virtual team space (such as an embedded diagram document), or any combination thereof.

The menu bar 306 may generally include options to generate new graphical objects. As illustrated, the menu bar 306 includes, among others, a cursor button 320, a tasks button 321, a sticky note button 322, a containers/templates button 323, a shape button 324, and an insert button 326.

The cursor button 320 may be selected by the user to select objects or activate other buttons.

The tasks button 321 may be selected by the user to add task shapes to the virtual team space 318, such as Lucid cards, imported Jira tasks, or other task shapes.

The sticky note button 322 may be selected by the user to generate a sticky note, such as sticky notes 328-333. In some embodiments, the user may paste a list of text in the virtual team space 318 to automatically generate sticky notes with the text.

The containers/templates button 323 may be selected by the user to open a containers/templates menu from which the user may drag out preconfigured template sections to build out the virtual team space 318. Each template or template section dragged out onto the virtual team space 318 may include one or more containers or other structure.

The shape button 324 may be selected by the user to generate graphical objects with predefined shapes or types, e.g., rectangle, diamond, circle, ellipse, bracket, etc. For instance, selection of the shape button 324 may open a popup menu or other interface that includes a set of shapes to choose from; selection of one of the shapes from the popup menu may insert a graphical object with the selected shape on the canvas 302.

Figure 3B:
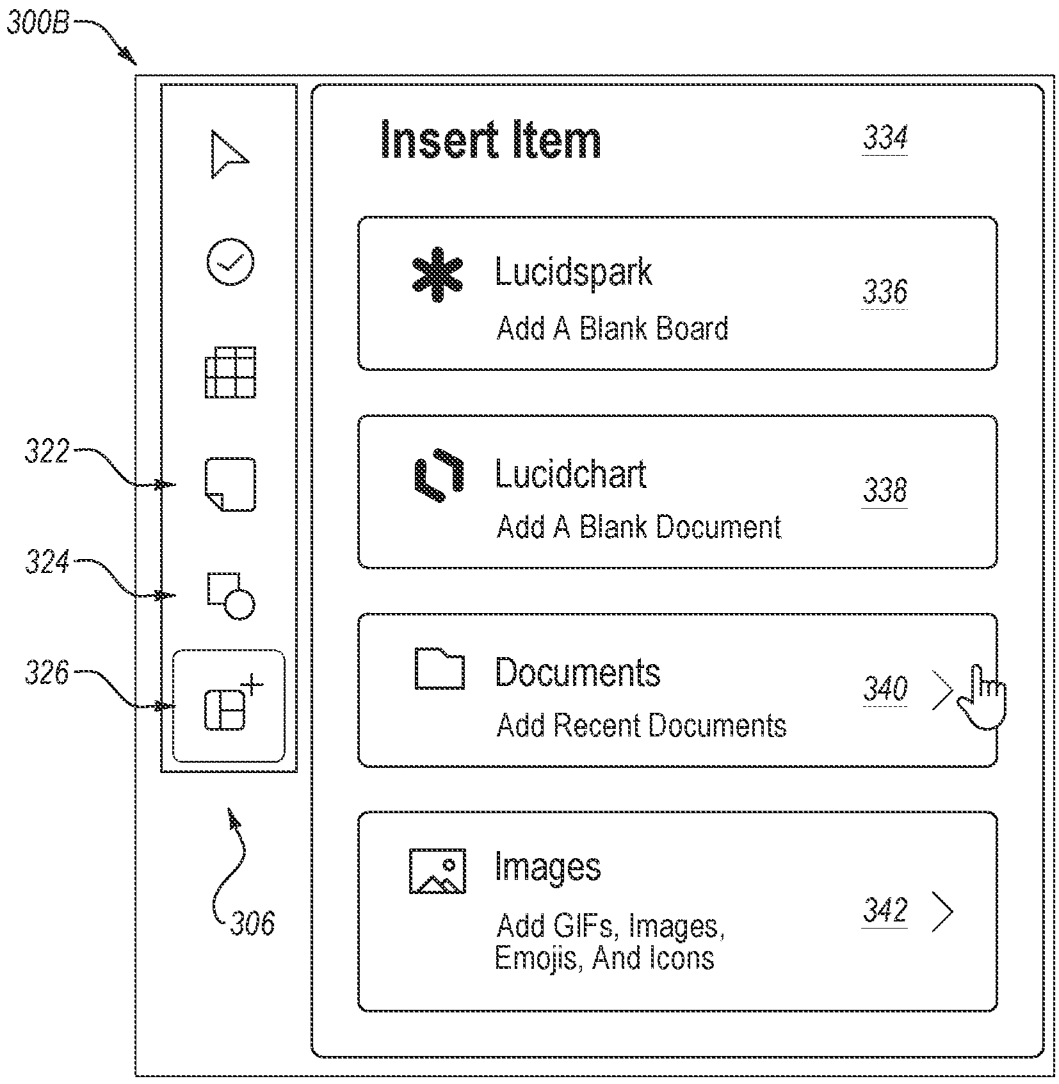
FIG. 3B includes a graphical representation of an example popup menu that may opened in response to selection of an insert button of FIG. 3A.

The insert button 326 may be selected by the user to insert items into the virtual team space 318. The items may include documents, images, or other items. In some embodiments, a popup menu or other interface may be opened in response to selection of the insert button 326. FIG. 3B includes a graphical representation 300B of an example popup menu 334 that may be opened in response to selection of the insert button 326, arranged in accordance with at least one embodiment described herein. As illustrated, the popup menu 334 includes various buttons that may be selected to insert a corresponding item into the virtual team space 318, including a blank whiteboard document button 336, a blank diagram document button 338, a recent document button 340, and an image button 342.

Selection of the blank whiteboard document button 336 may insert, or embed, a blank whiteboard document, such as a LUCIDSPARK document, in the virtual team space 318.

Selection of the blank diagram document button 338 may insert, or embed, a blank diagram document, such as a LUCIDCHART document, in the virtual team space 318.

Selection of the recent document button 340 may open a popup menu or other interface with a set of one or more recent documents from which a given one of the one or more recent documents may be selected. Selection of the given recent document may insert, or embed, the recent document in the virtual team space 318.

Selection of the image button 342 may open a popup menu or other interface with a set of one or more GIFs, images, emojis, icons, or the like from which a given one of the GIFs, images, emojis, or icons may be selected. Selection of the GIF, image, emoji, or icon may insert, or embed, the selected GIF, image, emoji, or icon in the virtual team space 318.

Returning to FIG. 3A, the contextual formatting menu bar 308 may be displayed when a graphical object is generated and/or while it is selected, e.g., for editing, and may disappear when no graphical object is selected. In this example, the sticky note 329 has just been generated and/or selected for editing, in response to which the contextual formatting menu bar 308 is displayed, e.g., by the virtual team application 214. The contextual formatting menu bar 308 may include one or more buttons to edit or modify the selected sticky note 329. For example, a persist button may be selected by the user to designate the sticky note 329 as a persistent sticky note. As another example, a refresh button may be selected by the user to designate the sticky note 329 as a refreshable sticky note. As another example, the sticky note 329 may have a default state of non-persistent and/or the menu 308 may include a non-persistent button that may be selected to designate the sticky note 329 as a non-persistent sticky note. As another example, a change shape button may be selected by the user to change a shape or type of the selected graphical object. As another example, a fill color button may be selected to set a fill color of the selected graphical object. As another example, a text font button may be selected to set a text font of the selected graphical object. As another example, a font size button may be selected to change the font size of text included in the selected graphical object. As another example, one or more text formatting buttons may be selected to set a corresponding one of various text attributes of text within the selected graphical object, such as bold, italics, underline, strikethrough, or alignment and/or to insert hyperlinks in the text. As another example, a reaction button may be selected to react to the selected graphical object. As another example, a tagging button may be selected to apply a tag to the selected graphical object. As another example, a lock button may be selected to lock the position, size, text, or other attribute(s) of the selected graphical object.

The particular options or buttons included in the contextual formatting menu bar 308 may vary depending on the selected graphical object. For example, the fill color button and text formatting buttons may be included in the contextual formatting menu bar 308 when the selected graphical object is a sticky note or other graphical object that has a fill color and text, but may be omitted from the contextual formatting menu bar 308 when the selected graphical object is a connector or other graphical object that lacks a fill color and text. The contextual formatting menu bar 308 may disappear when no graphical object is selected.

In some embodiments, selection of a graphical object may highlight the selected object and/or reveal controls that are visible while the graphical object remains selected and disappear when the graphical object is not selected. For example, FIG. 3A shows that while the sticky note 329 is selected, it is outlined to highlight it and controls for rotation, resizing, and connectors are displayed. In some embodiments, the rotation control (e.g., the curved bidirectional arrow above and to the left of the sticky note 329) may be grabbed and dragged (e.g., by operation of a mouse or other input device) generally around the sticky note 329 to rotate the sticky note 329. Alternatively or additionally, the resizing control (e.g., the four circles at the four corners of the sticky note 329 and/or the four sides of the sticky note 329) may be grabbed and dragged inward to decrease the size of the sticky note 329 or outward to increase the size of the sticky note 329. Alternatively or additionally, the connector control (e.g., the curved arrow within the circle to the right of the sticky note 329) may be grabbed and dragged from a given side of the sticky note to generate a connector that begins at the given side and terminates where the connector is released (e.g., by operation of the mouse or other input device).

The menu bar 310 may include one or more buttons or other widgets that provide various control in the virtual team space 318. For example, a table of contents button may be selected by the user to navigate between different sections of the virtual team space 318 that are designated by frames or other particular type of container by, e.g., selecting a name of a given frame or section from a table of contents. As another example, an undo button may be selected by the user to undo an immediately preceding operation of the user in the virtual team space 318. As another example, a redo button may be selected by the user to redo an immediately preceding operation of the user in the virtual team space 318. As another example, a zoom widget may include a zoom-in button ("+" in FIG. 3A) to zoom in on the virtual team space 318, a zoom-out button ("−" in FIG. 3A) to zoom out on the virtual team space 318, and a zoom level field (illustrated as "100%" in FIG. 3A) that may indicate the current zoom level and/or within which the user may type a value of a desired zoom level to change the zoom to the desired zoom level without using the zoom-in or zoom-out buttons. As another example, a full-screen button may be selected to change to full-screen view, and this button may change to a reduce screen button in the full-screen view where selection of the reduce screen button changes back to a reduced screen view. A mini map button may be selected to open a navigation interface for the virtual team space 318.

With continued reference to FIG. 3A, the virtual team space 318 includes various structural elements including containers 345-349. Each container 345-349 may include an outline and a container name. For example, the container 345 has a name of "Notes", the container 346 has a name of "To do", the container 347 has a name of "In Progress", the container 348 has a name of "Done", and the container 349 has a name of "Resources". The containers 345-349 may each include any content or no content. For instance, the container 345 includes sticky notes 330-333, the containers 346-348 each include one or more task graphical objects 350-353, and the container 349 includes one or more document preview graphical objects 354, 355.

The task graphical objects 350-353 may be generated within the virtual team space 318 or imported from another document or application. For example, the task graphical objects 350-353 may represent issues imported from JIRA or other application.

The document preview graphical objects 354, 355 may each graphically represent an embedded document within the virtual team space 318. Each embedded document may be of any suitable type, such as a whiteboard document, diagram document, word processing document, spreadsheet document, or the like. Each document preview graphical object 354, 355 may indicate the type of the corresponding embedded document. As illustrated, each document preview graphical object 354, 355 includes a name of the corresponding embedded document, e.g., "File1" or "File2", and an icon next to the name that indicates the type of the corresponding embedded document. In this example, the icon next to the name "File1" of the document preview graphical object 354 is an asterisk that indicates in this example that the corresponding embedded document is a whiteboard document while the icon next to the name "File2" of the document preview graphical object 355 is two opposing caret symbols that indicates in this example that the corresponding embedded document is a diagram document. Each document preview graphical object 354, 355 may additionally include a thumbnail preview of the corresponding embedded document. In response to selection of a given one of the document preview graphical objects 354, 355, the corresponding embedded document may be opened. Some embedded files may be expanded directly within the virtual team space 318 responsive to selection of a given one of the document preview graphical objects 354, 355, allowing users to view and edit the content of the embedded file without opening a new tab or leaving the virtual team space 318. Other embedded files may open in a separate tab or application in response to selection of a given one of the document preview graphical objects 354, 355. The document preview graphical objects 354, 355 (and other document preview graphical objects) may alternatively synonymously be referred to as embedded documents as each document preview graphical object specifically represents a corresponding embedded document and is selected to open the corresponding embedded document with the virtual team space 318.

Documents may be embedded in the virtual team space 318 in any suitable manner. In some embodiments, a set of one or more graphical objects may be selected as a group, in response to which the virtual team application 214 may display a menu bar or other interface that includes a button or option to embed a document of a specified type in the virtual team space with the selected one or more graphical objects. In response to input to create the embedded document of the specified type (e.g., in response to selection of the relevant button or option from the menu bar), the virtual team application 214 may create, in the virtual team space 318, the embedded document of the specified type, the embedded document including the selected set of one or more graphical objects. The virtual team application 214 may create and display in the virtual team application a corresponding document preview graphical object.

Alternatively or additionally, the virtual team application 214 may add contextual content to the document preview graphical object. The contextual content may include a description, summary, or the like input by a user into a text field of the document preview graphical object. For instance, each of the document preview graphical objects 354, 355 includes a text field labeled "Description" in FIG. 3A in which a user can position their mouse cursor and enter the contextual content (e.g., description, summary, etc.), in response to which the virtual team application 214 may add the contextual content to the corresponding document preview graphical object 354, 355.

In some embodiments, containers in the virtual team space 318 may be designated as containers of content to be persisted across time periods of the virtual team space 318 or as containers of content to be refreshed. A container designated as a container of content to be persisted may be referred to as a persistent container. A container designated as a container of content to be refreshed may be referred to as a refreshable container. A container may be designated as a persistent container or a refreshable container in any suitable manner. For instance, a container may be selected (e.g., via right click, left click, or in some other manner), in response to which a popup menu, a contextual formatting menu bar, or other interface may be displayed that includes a first button (e.g., a persist button) and a second button (e.g., a refresh button). Selection of the first button may designate the container as a persistent container while selection of the second button may designate the container as a refreshable container. As another example, the popup menu, contextual formatting menu bar, or other interface displayed in connection with selection (e.g., right click, left click, or other selection) of the container may include a radio button that may be toggled between a persist option or a refresh option where toggling the radio button to the persist option designates the container as a persistent container and toggling the radio button to the refresh option designates the container as a refreshable container.

Alternatively or additionally, content in the virtual team space 318 may be designated as content to be persisted across time periods of the virtual team space 318 or as content to be wiped (e.g., content to be removed from the current time period of the virtual team space 318 following and/or in response to creation of a latest time period of the virtual team space 318).

Content designated as content to be persisted may be referred to as persistent content. Content designated as content to be wiped may be referred to as wipeable content. Content may be designated as persistent content or wipeable content in any suitable manner. For instance, content (such as a sticky note, text box graphical object, embedded file, image, or the like) may be selected (e.g., via right click, left click, or in some other manner), in response to which a popup menu, a contextual formatting menu bar, or other interface may be displayed that includes a first button (e.g., a wipe button). Optionally, the interface may also include a second button (e.g., a refresh button). Selection of the first button may designate the content as persistent content while selection of the second button, if present, may designate the content as wipeable content. As another example, the popup menu, contextual formatting menu bar, or other interface displayed in connection with selection (e.g., right click, left click, or other selection) of the container may include a radio button that may be toggled between a persist state or a wipe state where toggling the radio button to the persist state designates the content as persistent content and toggling the radio button to the wipeable state designates the content as wipeable content. Alternatively or additionally, content may be designated as wipeable content by designating a container in which the content is located as a refreshable container. In some embodiments, all content within a refreshable container that has not been designated as persistent content may be designated as wipeable content.

Alternatively or additionally, the designation of structure or content may be modified over time (e.g., by a user) to update how the structure or content is treated when time periods are created. For example, persistent content that has persisted across numerous time periods may have its designation changed to refreshable content or wipeable content, may have its persist designation removed (if the content is located within a refreshable container), or may otherwise have its persist designation modified to have it wiped or refreshed, in which case the content may be wiped (in the case of wipeable content) or a portion of the content may be wiped while another portion of the content persists (in the case of refreshable content) the next time a time period is created.

In some embodiments, a container or other structure that is not designated as a persistent container/structure or a refreshable container/structure may be wiped from the current version of the virtual team space 318 following and/or in response to creation of a latest time period. In some other embodiments, each container or other structure may have a default designation of refreshable container (or persistent container) which may be changed to persistent container (or refreshable container) through appropriate input (e.g., selection of the container to open an interface that includes a persist button (or a refresh button) that may be selected to designate the container as desired).

Alternatively or additionally, the virtual team application 214 may visually indicate for one or more containers (or other structure) or content in a given virtual team space 318 whether the container or content is persistent, refreshable, and/or wipeable. For example, as illustrated in FIG. 3A, a status icon 356-360 is provided near the top right corner of each of the containers 345-349 and is associated with the corresponding one of the containers 345-349. As further illustrated in FIG. 3A, a status icon 361-364 is provided near the right side and/or top right of each of various text box graphical objects and the sticky note 332. The text box graphical objects include one with the text "Meeting", another with the text "Project Progress", and another with the text "Action Items". The status icon 356 is associated with the container 345, the status icon 357 is associated with the container 346, the status icon 358 is associated with the container 347, the status icon 359 is associated with the container 348, the status icon 360 is associated with the container 349, the status icon 361 is associated with the "Meeting" text box graphical object, the status icon 362 is associated with the "Project Progress" text box graphical object, the status icon 363 is associated with the sticky note 332, and the status icon 364 is associated with the "Action Items" text box graphical object. In the illustrated embodiment, the status icons 356 and 359 are the same while the status icons 357, 358, and 360-364 are the same. One type of status icon may visually indicate containers designated as persistent containers or content designated as persistent content while another type of status icon may visually indicate containers designated as refreshable containers. For example, each of the status icons 357, 358, and 360-364 visually indicates that the corresponding container 345 or 349 or content is persistent while each of the status icons 356, 359 visually indicates that the corresponding container 345 or 359 is refreshable.

FIG. 3A further illustrates an example legend 366 (or table of icons) that may be displayed (e.g., by the visual collaboration application 214) to explain the meaning of the two types of status icons. For example, the legend 366 includes status icons 367 and 368 together with explanations of the meaning of the status icons 367 and 368. The explanation for the status icon 367 is "Content persists", thereby indicating that content bearing the same status icon as the status icon 367, or content within a container bearing the same status icon as the status icon 367, persists across time periods of the visual collaboration space 318. The containers 346, 347, and 349 and content bearing the same status icons 357, 358, and 360-364 as the status icon 367 have been designated as persistent containers or persistent content, as indicated by the status icons 357, 358, and 360-364. The explanation for the status icon 368 is "Only structure persists", thereby indicating that content within a container bearing the same status icon as the status icon 368 is wiped from the current version of the visual collaboration space 318 following and/or in response to creation of a latest time period of the virtual team space 318. The containers 345 and 349 bearing the same status icons 356 and 359 as the status icon 368 have been designated as refreshable containers, as indicated by the status icons 356 and 359. In some embodiments, the legend 366 may be closed (e.g., by selection of the "x" button in the top right corner of the legend 366) or opened by a user In some embodiments, content within a refreshable container may nevertheless be persistent content. For example, the container 345 is a refreshable container as indicated by the status icon 356 while the sticky note 332 is persistent content as indicated by the status icon 363, despite being located within the refreshable container 345. Accordingly, following and/or in response to creation of a latest time period of the virtual team space 318, the sticky notes 330, 331, and 333 will be wiped from the current version of the virtual team space 318 because they are located within the refreshable container 345 and are not individually designated as persistent content (as indicated by the absence of a status icon that is the same as the status icon 367) while the sticky note 332 will be persisted in the current version of the virtual team space 318 since it is designated as persistent content (as indicated by the status icon 363 that is the same as the status icon 367).

In some embodiments, the UI displayed by the virtual team application 214 may include a new time period button 370, a time period list button 372, and/or other interface elements relating to versioning of the virtual team space 318.

In response to selection of the new time period button 370, the virtual team application 214 may create a new (or current) time period of the virtual team space 318 (e.g., at a particular point in time) and then following and/or in response to creation of the new time period, persist or wipe structure or content in or from the new time period of the virtual team space 318 based on, e.g., the designations of the structure or content. Alternatively or additionally, the virtual team application 214 may display a confirmation interface in which a user can provide input to cancel creation of the new time period or confirm creation of the new time period. In some embodiments, the interface may include a warning to advise the user that the current time period may become a prior time period with limited functionality (e.g., compared to the new time period of the virtual team space 318).

Figure 3C:
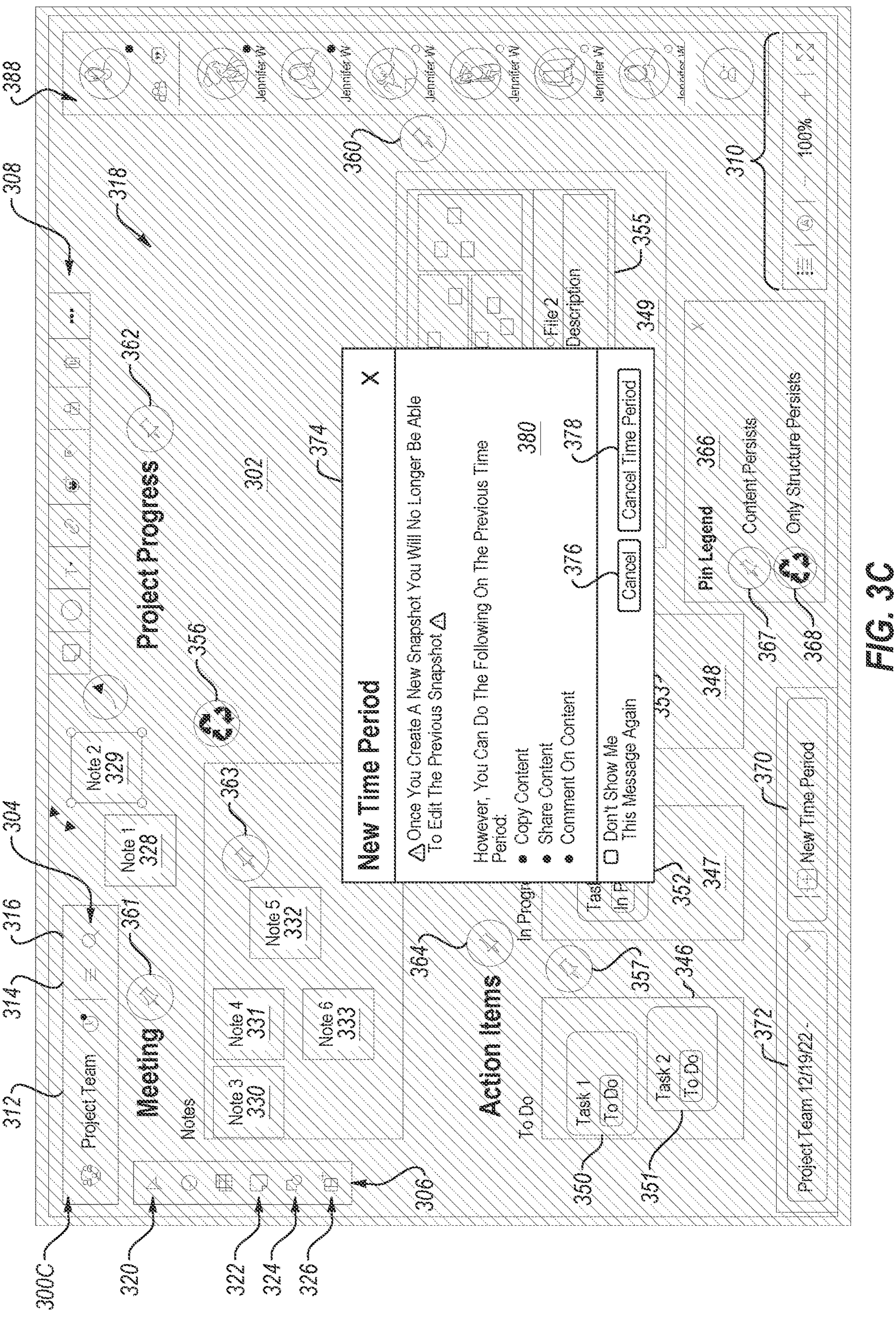
FIG. 3C includes an example graphical representation of the UI of FIG. 3A following selection of a new time period button of FIG. 3A.

FIG. 3C includes an example graphical representation 300C of the UI of FIG. 3A following selection of the new time period button 370, arranged in accordance with at least one embodiment described herein. The legend 366 is not displayed in FIG. 3C (e.g., as a result of being closed by a user).

As illustrated, a confirmation interface 374 is displayed by the virtual team application 214 in the virtual team space 318, e.g., in response to selection of the new time period button 370. The confirmation interface 374 includes a cancel button 376 and a confirm button 378. Selection of the cancel button 376 may cause the virtual team application 214 to cancel creation of a new time period. Selection of the confirm button 378 may cause the virtual team application to create the new time period. The confirmation interface 374 may further include a warning 380 to advise the user that the current time period may become a prior time period with limited functionality compared to the new time period. In this example, the warning 380 advises that a prior team period cannot be edited but content may be copied or shared from a prior team period or comments regarding content may be added to the prior time period.

Figure 3D:
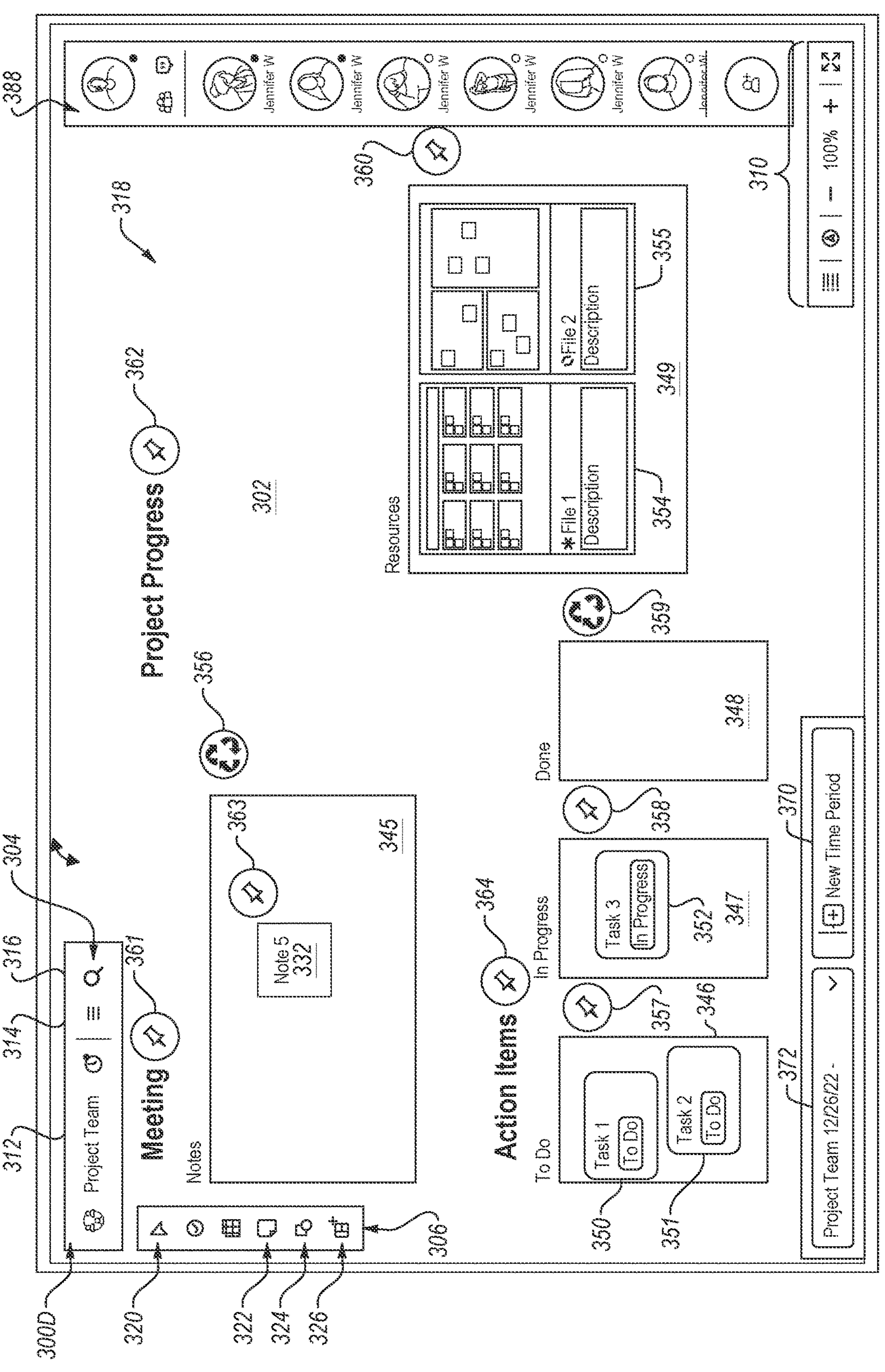
FIG. 3D includes an example graphical representation of the UI of FIG. 3A following creation of a new time period.

FIG. 3D includes an example graphical representation 300D of the UI of FIG. 3A following creation of a new time period, arranged in accordance with at least one embodiment described herein. FIG. 3D depicts the new time period of the virtual team space 318 while FIG. 3A depicts what was the current time period of the virtual team space 318 prior to creation of the new time period and has now become a prior time period of the virtual team space 318 following creation of the new time period. For convenience in the discussion that follows, the time period of the virtual team space 318 illustrated in FIG. 3A will be referred to as the prior time period of the virtual team space 318.

As illustrated, and with comparison of FIG. 3A to FIG. 3D, creation of the new time period may cause and/or be followed by one or more of the following.

First, structure may be persisted across the time periods of the virtual team space 318. For example, each of the containers 345-349 is persisted across the time periods in the current version of the virtual team space 318 as each of the containers 345-349 is structure that persists across time periods in the virtual team space 318. As shown, the containers 345-349 have persisted from the prior time period of the virtual team space 318 of FIG. 3A to the new time period of the virtual team space 318 of FIG. 3B.

Second, content designated as persistent content may be persisted across the time periods of the virtual team space 318. For example, sticky note 332 and text box graphical objects 361, 362, and 364 individually designated as persistent content (as indicated by status icons 361-364) are persisted from the prior time period of the virtual team space 318 of FIG. 3A to the new time period of the virtual team space 318 of FIG. 3D. Similarly, all content collectively designated as persistent content by inclusion in a corresponding one of containers 346, 347, and 349 designated as a persistent container (as indicated by status icons 357, 358, and 360) is persisted across the time periods of the virtual team space 318. In particular, task graphical objects 350-352 and embedded documents 354, 355 are persisted from the prior time period of the virtual team space 318 of FIG. 3A to the new time period of the virtual team space 318 of FIG. 3D since each is included in a corresponding one of containers 346, 347, or 349 designated as a persistent container (as indicated by status icons 357, 358, 360).

Third, undesignated content may be wiped. For example, undesignated sticky notes 328 and 329 that are on the canvas 302 without being in any containers as well as undesignated sticky notes 330, 331, and 333 and undesignated task graphical object 353 that are in containers 345 and 348 designated as refreshable containers (as indicated by icons 356, 359) may be wiped. As such, the foregoing graphical objects, while illustrated in FIG. 3A, are absent from FIG. 3D as a result of being wiped.

In some embodiments, the time period list button 372 includes a filename and/or period of time of the virtual team space 318 in the canvas 302. In this example, the filename is "Project Team" (see also field 312 in the menu bar 304) and the period of time is "12/19/22-" in FIGS. 3A and 3C and "12/26/22-" in FIG. 3D. When the period of time included in the time period list button 372 includes a single date followed by a hyphen, this may indicate the current time period of the virtual team space 318 is displayed on the canvas 302. The single date in this example may refer to the beginning date of the current period of time. On the other hand, when the period of time in the time period list button 372 includes two dates separated by a hyphen, this may indicate a time period of the virtual team space 318 covering the period of time is displayed on the canvas 302. The two dates in this example may include a start date and an end date. The start date may indicate the date on which the time period was created and the end date may indicate the date on which an immediately subsequent time period was created. Alternatively, the dates may be entered manually and may differ from the actual creation date. For example, a user may create a new time period on one day for a sprint that starts on a subsequent day and may set the start date as the subsequent day. Other schemes may be implemented to identify the period of time and/or the time period of the virtual team space 318 currently displayed on the canvas 302. For example, the time period list button 372 may include "Current" to indicate that the current time period of the virtual team space 318 is displayed on the canvas 302 (rather than including a single date followed by a hyphen) or a single date or timestamp to indicate a beginning or end date or beginning or end time of a time period of the virtual team space 318 that is currently displayed on the canvas 302. Alternatively, the time period list button 372 may not identify at all any time period, period of time, or version of the virtual team space 318 currently displayed on the canvas 302, or a user may manually enter a description or title for each time period.

In response to selection of the time period list button 372, the virtual team application 214 may display (e.g., in a popup menu or other interface) a list of one or more time periods of the virtual team space 318. In response to selection of a corresponding time period from the list, the virtual team application 214 may open the selected time period of the virtual team space 318 in the canvas 302. Alternatively or additionally, a user may select one or more time periods to be deleted from the list.

Figure 3E:
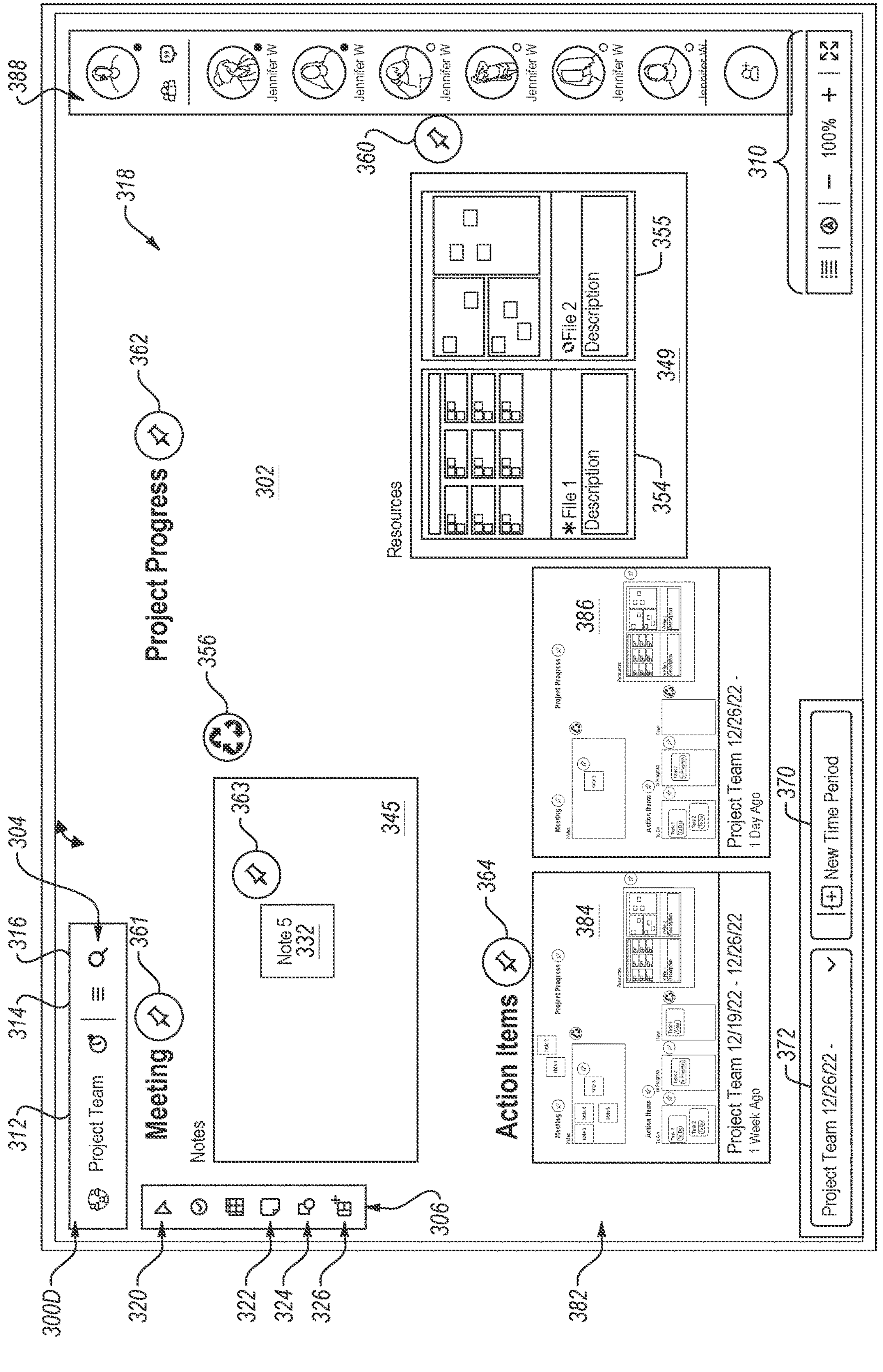
FIG. 3E includes an example graphical representation of the UI of FIG. 3D following selection of a time period list button or other input to access a time period.

FIG. 3E includes an example graphical representation 300E of the UI of FIG. 3D following selection of the time period list button 372 or other input to access a time period, arranged in accordance with at least one embodiment described herein. As illustrated, the virtual team application 214 may display, in response to selection of the time period list button 372, an interface 382 including a list of one or more time periods of the virtual team space 318. As illustrated, the list represents each of the time periods using a thumbnail image 384, 386 of the time period. The interface 382 may present the list of one or more time periods in any other suitable form. The thumbnail image 386 represents the current time period of the virtual team space 318 and the thumbnail image 384 represents the most recent prior time period of the virtual team space 318. Selection of either thumbnail image 384, 386 will open the corresponding time period on the canvas 302 (unless already opened). In some embodiments, a given thumbnail image 384, 386 may be highlighted in response to the user hovering their mouse over the thumbnail image 384, 386 and/or in response to the user selecting the thumbnail image 384, 386. For example, as illustrated in FIG. 3E, the thumbnail image 384 is highlighted (as indicated by a thicker outline than the thumbnail image 386) to indicate that the user's mouse is hovering over the thumbnail image 384.

Some embodiments herein may leverage virtual team spaces, such as the virtual team spaces 114, 318, as virtual bullpens or virtual home bases for teams of users. Such a virtual team space may be referred to as a team space. A given team space may be accessible to all users (e.g., within an organization or group of users), may have limited access for only team members of a team associated with the team space, or the like. In these and other embodiments, the UI of FIG. 3A may further include a team roster 388, as illustrated in FIGS. 3A and 3C-3E.

The team roster 388 may identify some or all users of a team associated with the virtual team space 318. In general, the users may be identified by or with a corresponding user icon in the team roster 388. Each user icon may include a name, username, avatar, photograph, image, or other representation of a given user. In the illustrated embodiment, the user icon of each user includes an image and name (first name and last initial) of the user. The team roster 388 may be scrollable, may have multiple columns and/or rows of user icons, and/or may have any other arrangement to accommodate user icons for all team members of the team. In some embodiments, a given user may be assigned to or associated with a given task or other content by dragging and dropping a corresponding user icon from the team roster 388 to the task or other content.

Figure 4:
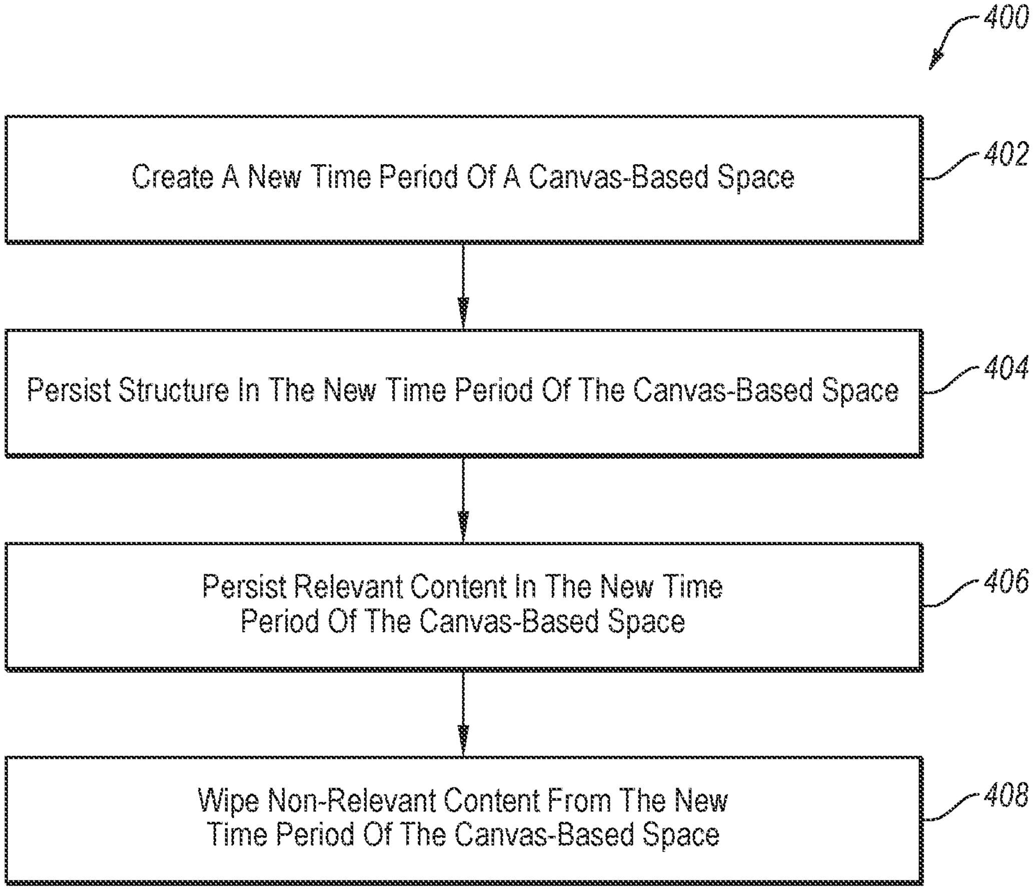
FIG. 4 illustrates a flowchart of an example method to manage a virtual team space.

FIG. 4 illustrates a flowchart of an example method 400 to manage a virtual team space, arranged in accordance with at least one embodiment described herein. The method 400 may be performed by any suitable system, apparatus, or device. For example, any one or more of the client devices 204, 206, 208, the virtual team application 214, and/or the server 202 of FIG. 2 may 2 may perform or direct performance of one or more of the operations associated with the method 400. In these and other embodiments, the method 400 may be performed or controlled by one or more processors based on one or more computer-readable instructions stored on one or more non-transitory computer-readable media. Alternatively or additionally, embodiments herein may include a non-transitory computer-readable medium having computer-readable instructions stored thereon that are executable by a processor to perform or control performance of the method 400 or one or more operations thereof. The method 400 may include one or more of blocks 402, 404, 406, and/or 408.

At block 402, the method 400 may include creating a new version or new time period of a canvas-based space. The canvas-based space may include, for example, the virtual team space 212 of FIG. 2 or the virtual team space 318 of FIG. 3. The new time period may be created in response to input, such as user input, requesting creation of the new time period. For example, the new time period may be created in response to selection of the new time period button 370 and/or the confirm button 378 of FIG. 3D. Creating the new time period may include saving a point-in-time copy of the virtual team space. Alternatively or additionally, the new time period may be created automatically such as at a specified date or cadence (e.g., every other Monday) or based on a linked calendar event (e.g., create new time period on a date that a certain meeting happens). Following and/or in response to creation of the new time period, block 402 may be followed by one or more of blocks 404, 406, and/or 408.

At block 404, the method 400 may include persisting structure in the new time period (or current version or time period) of the canvas-based space. Persisting structure in the new time period of the canvas-based space may include retaining, in the new time period of the canvas-based space following creation of the new time period, structure that existed in an immediately prior time period of the canvas-based space. As an example, and referring to FIGS. 3A and 3D, persisting structure may include retaining in the new time period of the virtual team space 318 the containers 345-349 that existed in the immediately prior time period of the virtual team space 318.

At block 406, the method 400 may include persisting relevant content in the new time period (or current version or time period) of the canvas-based space. Relevant content may include content designated manually or automatically as persistent content or refreshable content. Persisting the relevant content in the new time period of the canvas-based space may include retaining, in the new time period of the canvas-based space, the relevant content from the immediately prior time period of the canvas-based space. As an example, and referring to FIGS. 3A and 3D, persisting relevant content may include retaining in the new time period of the virtual team space 318 the sticky note 332, the task graphical objects 350-352, and the embedded documents 354, 355 that existed in the immediately prior time period of the virtual team space 318 based on the designation of the sticky note 332, the task graphical objects 350-352, and the embedded documents 354, 355 as persistent content.

At block 408, the method 400 may include wiping non-relevant content from the new time period (or current version or time period) of the canvas-based space. Wiping non-relevant content from the new time period of the canvas-based space may include deleting or removing the non-relevant content from the new time period of the canvas-based space. As an example, and referring to FIGS. 3A and 3D, wiping non-relevant content from the new time period of the canvas-based space may include deleting from the new time period of the virtual team space 318 the sticky notes 328-331 and 333 and the task graphical object 353, as illustrated in FIG. 3D.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. For instance, the method 400 may be combined with one or more other methods and processes described herein and/or steps or operations of the method 400 may be substituted for steps or operations of one or more other methods and processes, or vice versa.

For example, the method 400 may further include creating multiple time periods (or versions) of the canvas-based space over time and providing access to each of the multiple time periods to one or more users. The time periods may be created periodically according to a regular cadence, randomly, or with any other timing. Users may access the time periods through an appropriate interface, such as the interface 382 described with respect to FIG. 3E.

As another example, the method 400 may further include saving at least some of a revision history of the canvas-based space and providing access to the revision history to one or more users. The revision history may include a record of all or at least some changes made to the current time period of the canvas-based space since its creation. In some embodiments, a user may access the revision history and select one or more of the changes to undo or revert.

As another example, the method 400 may further include, prior to creating the new time period, receiving first input effective to designate the relevant content as content to persist across time periods of the canvas-based space. The first input may include input to individually designate the relevant content as content to persist, such as selection of a persist button while the relevant content is selected. The first input may include input to designate a group of content that includes the relevant content as content to persist, such as selection of a persist button while the group of content is selected. Alternatively or additionally, the method 400 may further include, prior to creating the new time period, receiving second input effective to designate a container within which the non-relevant content is located as a container to be refreshed across time periods of the canvas-based space. The second input may include, e.g., selection of a refresh button while the container is selected.

As another example, the method 400 may further include displaying a team roster that represents a team including multiple team members, such as the team roster 388 of FIGS. 3A and 3C-3E. The team roster may include multiple user icons that each represents a different one of the team members. The user icons may include a first user icon that represents a first team member of the team members. The method 400 may further include receiving input to associate the first user icon with a graphical object in the canvas-based space. Receiving input to associate the first user icon with the graphical object may include receiving input to drag the first user icon from the team roster and drop the first user icon on the graphical object in the canvas-based space. The method 400 may further include associating the first team member represented by the first user icon with the graphical object. Associating the first team member represented by the first user icon with the graphical object may include assigning a task associated with the graphical object to the first team member. The method 400 may further include adding an identifier of the first team member to the graphical object to indicate the association of the first team member with the graphical object. In some embodiments, dragging and dropping a team member (or more particularly, a user icon from the team roster that represents a team member) onto content may be effective to designate the content as persistent content.

As another example, the method 400 may further include providing access to the virtual team space to each team member of a team that includes multiple team members. The method 400 may further include receiving input to designate at least one of the following as the first content to be persisted: one or more decisions to be made by the team collectively or by one or more of the team members; tasks to be completed by one or more of the team members; a project timeline; a set of one or more goals of the team collectively or of one or more of the team members; or a set of one or more documents used or expected to be used on a recurring basis by the team.

As another example, the method 400 may further include receiving input to select a set of one or more graphical objects. The method 400 may further include receiving input to create an embedded document of a specified type with the selected set of one or more graphical objects. The method 400 may further include creating, in the canvas-based space, the embedded document of the specified type, the embedded document including the selected set of one or more graphical objects. The method 400 may further include adding contextual content to a document preview graphical object in the canvas-based space in response to input to add the contextual content. The document preview graphical object may represent the embedded document. The method 400 may further include, in response to selection of the document preview graphical object, opening the embedded document within an application corresponding to documents of the specified type and running the application with the opened embedded document within the canvas-based space.

In some embodiments of the method 400, the persisted structure, e.g., the structure that is persisted at block 404, includes at least one of a container, a purpose-dedicated section, or other structural element.

In some embodiments of the method 400, the persisted content, e.g., the relevant content persisted at block 406, includes at least one of: a sticky note graphical object; a task graphical object; a text box graphical object; a graphical diagram; a calendar; a project timeline; an organization chart; an embedded document; a team wiki; or team resources.

In some embodiments of the method 400, the wiped content, e.g., the non-relevant content wiped at block 408, includes at least one of: a sticky note graphical object; a task graphical object; a text box graphical object; a graphical diagram; a calendar; meeting notes; standup notes; or completed task graphical objects.

Figure 5:
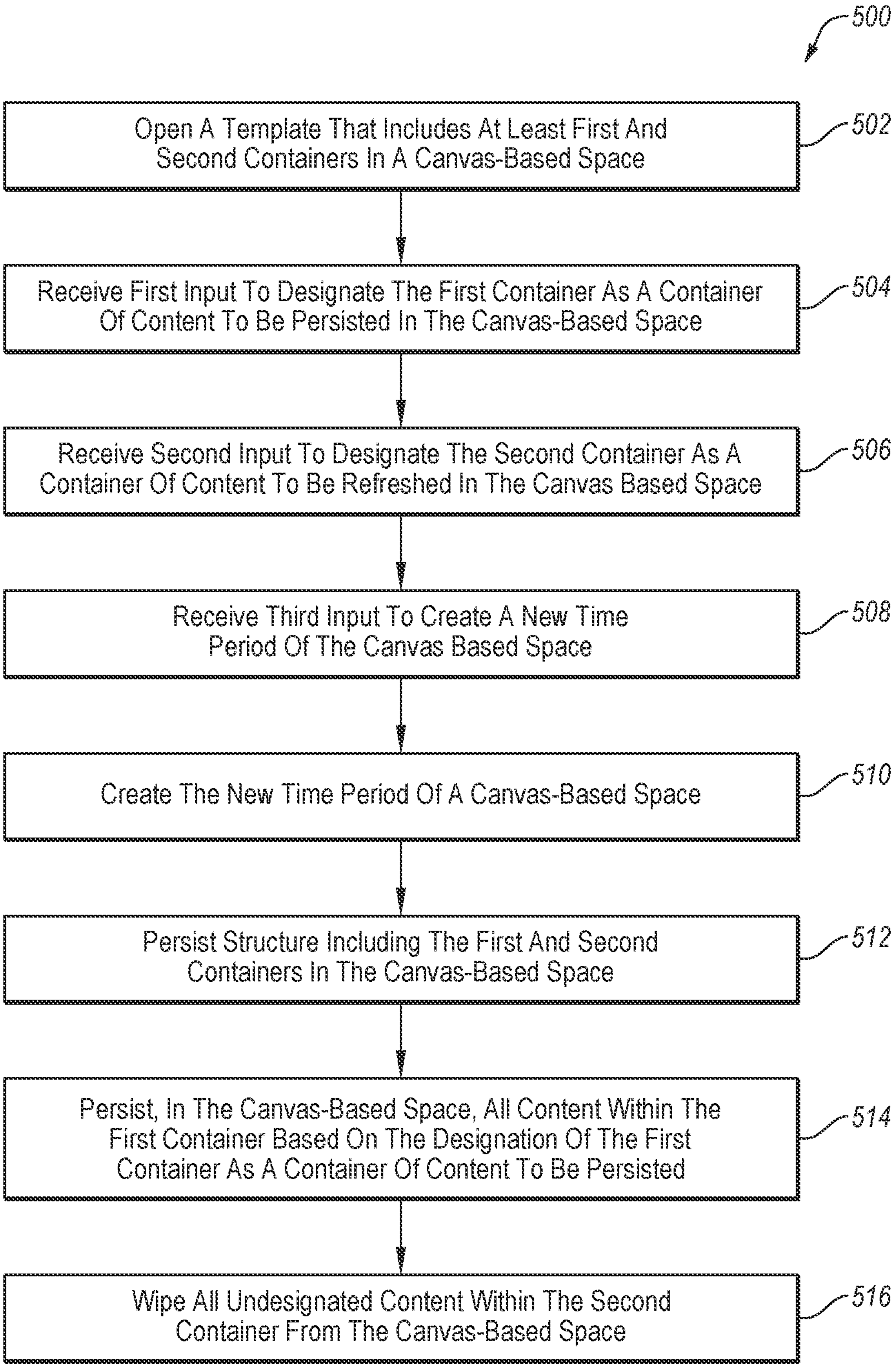
FIG. 5 illustrates a flowchart of another example method to manage a virtual team space.

FIG. 5 illustrates a flowchart of another example method 500 to manage a virtual team space, arranged in accordance with at least one embodiment described herein. The method 500 may be performed by any suitable system, apparatus, or device. For example, any one or more of the client devices 204, 206, 208, the virtual team application 214, and/or the server 202 of FIG. 2 may perform or direct performance of one or more of the operations associated with the method 500. In these and other embodiments, the method 500 may be performed or controlled by one or more processors based on one or more computer-readable instructions stored on one or more non-transitory computer-readable media. Alternatively or additionally, embodiments herein may include a non-transitory computer-readable medium having computer-readable instructions stored thereon that are executable by a processor to perform or control performance of the method 500 or one or more operations thereof. The method 500 may include one or more of blocks 502, 504, 506, 508, 510, 512, 514, and/or 516.

At block 502, the method 500 may include opening a template that includes at least first and second containers in a canvas-based space. The template may be opened in response to user input from within an already open virtual team space, such as selection of the insert button 326 from the menu bar 306 of FIG. 3A, followed by selection of the template button 344 from the popup menu 334 of FIG. 3B, followed by selection of a desired template. In another example, the template may be opened from a template gallery, e.g., in a docslist, selection of which may be effective to open a new virtual team space with structure as specified in the template. Block 502 may be followed by block 504.

At block 504, the method 500 may include receiving first input to designate the first container as a container of content to be persisted in the canvas-based space. Receiving input to designate the first container as a persistent container may include receiving input to select a persist button displayed in an interface while the first container is selected. Block 504 may be followed by block 506.

At block 506, the method 500 may include receiving second input to designate the second container as a container of content to be refreshed in the canvas-based space. Receiving input to designate the second container as a refreshable container may include receiving input to select a refresh button displayed in an interface while the second container is selected. Block 506 may be followed by block 508.

At block 508, the method 500 may include receiving third input to create a new time period of the canvas-based space. Receiving third input to create a new time period of the canvas-based space may include receiving input to select the new time period button 370 and/or the confirm button 378 of FIG. 3C. Alternatively or additionally, the new time period may be created automatically such as at a specified date or cadence (e.g., every other Monday) or based on a linked calendar event (e.g., create new time period on a date that a certain meeting happens).

The method 500 may further include creating the new time period of the canvas-based space. Following and/or in response to creation of the new time period, block 508 may be followed by one or more of blocks 512, 514, and/or 516.

At block 510, the method 500 may include persisting structure including the first and second containers in the canvas-based space. Persisting structure including the first and second containers in the canvas-based space may include retaining, in the new time period of the canvas-based space, structure that existed in an immediately prior time period of the canvas-based space. As an example, and referring to FIGS. 3A and 3D, persisting structure including the first and second containers in the new time period of the canvas-based space may include retaining in the new time period of the virtual team space 318 (FIG. 3D) the containers 349 and 345 that existed in the immediately prior time period of the virtual team space 318 (FIG. 3A).

At block 512, the method 500 may include persisting, in the new time period of the canvas-based space, all content within the first container based on the designation of the first container as a container of content to be persisted. Persisting all content within the first container based on the designation of the first container as a container of content to be persisted may include retaining, in the new time period of the canvas-based space following creation of the new time period, all content within the first container that existed in the immediately prior time period of the canvas-based space prior to creation of the new time period. As an example, and referring to FIGS. 3A and 3D, persisting all content within the first container based on the designation of the first container as a container of content to be persisted may include retaining, in the new time period of the virtual team space 318, the embedded documents 354, 355 within the container 349 that existed in the immediately prior time period of the virtual team space 318 prior to creation of the new time period.

At block 514, the method 500 may include wiping all undesignated content within the second container from the new time period of the canvas-based space. Wiping all undesignated content within the second container from the new time period of the canvas-based space may include deleting or removing all the undesignated content within the second container from the new time period of the canvas-based space. As an example, and referring to FIGS. 3A and 3D, wiping all undesignated content within the second container from the new time period of the canvas-based space may include deleting from the new time period of the virtual team space 318 the sticky notes 330, 331, and 333 within the container 345 that existed in the immediately prior time period of the virtual team space 318.

In some embodiments, the method 500 may further include, prior to receiving the third input at block 508, receiving additional input to designate first content within the second container as content to be persisted. Receiving additional input to designate first content within the second container as content to be persisted may include receiving input to select a persist button displayed in an interface while the first content is selected. For example, receiving the additional input to designate the first content within the second container as content to be persisted may include receiving input to select a persist button displayed in an interface while the sticky note 332 within the container 345 is selected. The method 500 may further include, following creation of the new time period, persisting, in the new time period of the canvas-based space, the first content within the second container based on the designation of the first content as content to be persisted. As an example, and referring to FIGS. 3A and 3D, persisting the first content within the second container based on the designation of the first content as content to be persisted may include retaining, in the new time period of the virtual team space 318, the sticky note 332 within the container 345 that existed in the immediately prior time period of the virtual team space 318 prior to creation of the new time period.

In some embodiments, the method 500 may further include, prior to receiving the third input, receiving additional input to designate first content in the canvas-based space that is outside of any containers in the canvas-based space as content to be persisted. Receiving additional input to designate first content in the canvas-based space that is outside of any containers as content to be persisted may include receiving input to select a persist button displayed in an interface while the first content is selected. For example, and referring to FIG. 3A, receiving the additional input to designate first content in the canvas-based space that is outside of any containers as content to be persisted may include receiving input to select a persist button displayed in an interface while the text box graphical object "Meeting" is selected, the text box graphical object "Meeting" being outside of all containers 345-349 (or any other containers) in the virtual team space 318. The method 500 may further include, following creation of the new time period, persisting, in the new time period of the canvas-based space, the first content that is outside of any of the containers based on the designation of the first content as content to be persisted. As an example, and referring to FIGS. 3A and 3D, persisting the first content that is outside of any of the containers based on the designation of the first content as content to be persisted may include retaining, in the new time period of the virtual team space 318, the text box graphical object "Meeting" that existed in the immediately prior time period of the virtual team space 318.

In some embodiments, the template opened at block 502 may be a first template and the method 500 may further include opening a second template in the canvas-based space such that both the first template and the second template are simultaneously open in the canvas-based space at different locations. The second template may be opened in the same, similar, or different manner as the first template.

In some embodiments, the method 500 may further include associating a first team member with a graphical object in the virtual team space. The first team member may be a member of a team that has access to the virtual team space. Associating the first team member with the graphical object may be performed in response to receiving input to drag and drop a first user icon that represents the first team member from a team roster onto the graphical object. The team roster may include a different user icon for each team member of the team. Associating the first team member with the graphical object may include assigning a task associated with the graphical object to the first team member. Alternatively or additionally, the method 500 may include adding an identifier of the first team member to the graphical object to indicate the association of the first team member with the graphical object. In some embodiments, dragging and dropping a team member (or more particularly, a user icon from the team roster that represents a team member) onto content may be effective to designate the content as persistent content.

In some embodiments, the method 500 may further include receiving input to embed a document of a specified type into the canvas-based space. The method 500 may further include embedding, in the canvas-based space, the document of the specified type. The method 500 may further include adding contextual content to a document preview graphical object in the canvas-based space in response to input to add the contextual content, the document preview graphical object representing the embedded document. The method 500 may further include displaying the added contextual content in the document preview graphical object.

Figure 6:
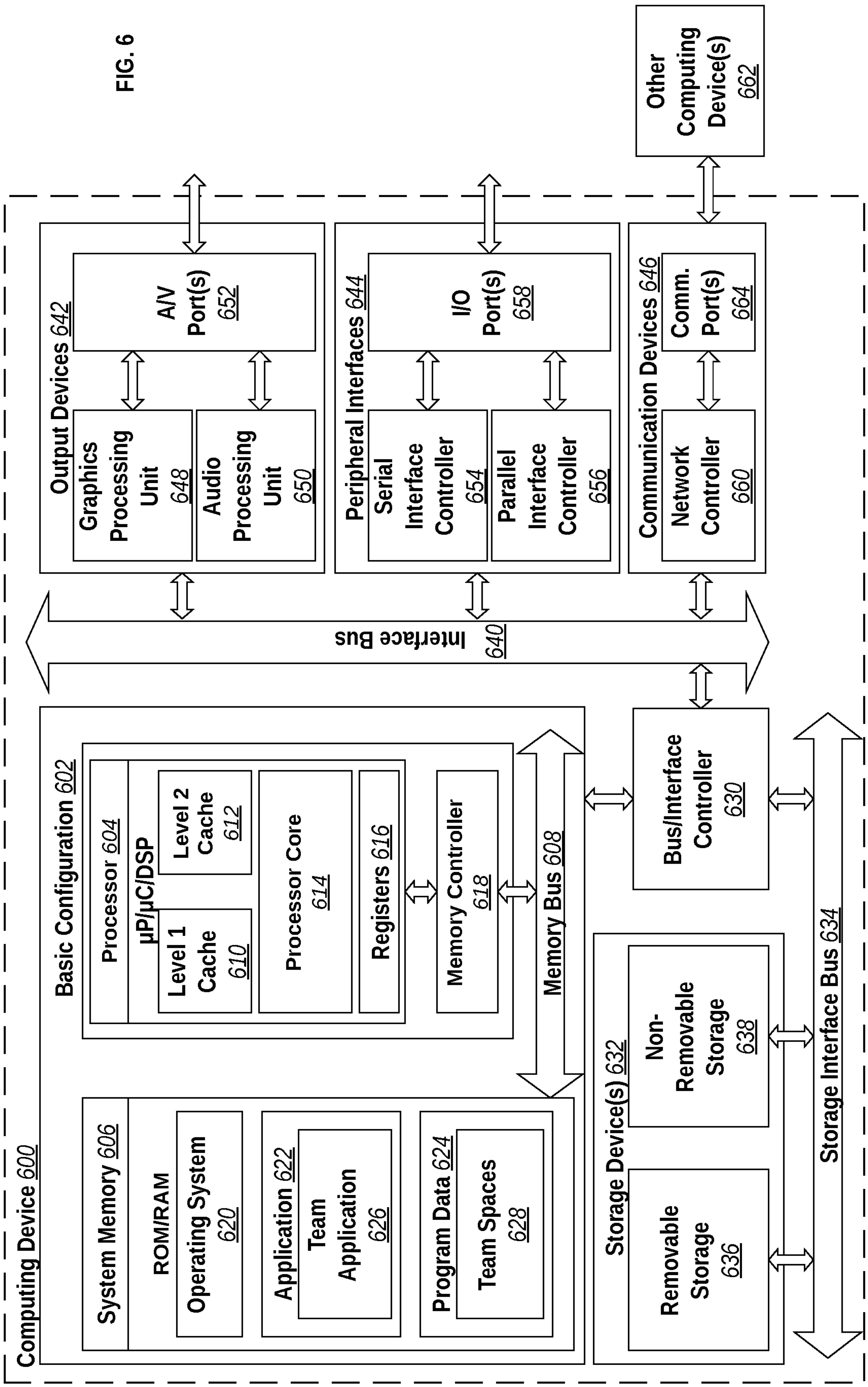
FIG. 6 is a block diagram illustrating an example computing device that is arranged to facilitate virtual team spaces, all arranged in accordance with at least one embodiment described herein.

FIG. 6 is a block diagram illustrating an example computing device 600 that is arranged to manage virtual team spaces, arranged in accordance with at least one embodiment described herein. The computing device 600 may include, be included in, or otherwise correspond to either or both of the server 202 or the client devices 204, 206, 208 of FIG. 2. In a basic configuration 602, the computing device 600 typically includes one or more processors 604 and a system memory 606. A memory bus 608 may be used to communicate between the processor 604 and the system memory 606.

Depending on the desired configuration, the processor 604 may be of any type including, but not limited to, a microprocessor (μP), a microcontroller (μC), a digital signal processor (DSP), or any combination thereof. The processor 604 may include one or more levels of caching, such as a level one cache 610 and a level two cache 612, a processor core 614, and registers 616. The processor core 614 may include an arithmetic logic unit (ALU), a floating point unit (FPU), a digital signal processing core (DSP Core), or any combination thereof. An example memory controller 618 may also be used with the processor 604, or in some implementations the memory controller 618 may include an internal part of the processor 604.

Depending on the desired configuration, the system memory 606 may be of any type including volatile memory (such as RAM), nonvolatile memory (such as ROM, flash memory, etc.), or any combination thereof. The system memory 606 may include an operating system 620, one or more applications 622, and program data 624. The application 622 may include a virtual team application 626 that is arranged to manage virtual team spaces. The virtual team application 626 may include, be included in, or otherwise correspond to the virtual team application 214 of FIG. 2. The program data 624 may include virtual team spaces 628 (which may include, be included in, or otherwise correspond to the virtual team spaces 212 of FIG. 2, 318 of FIGS. 2A-2E, or other virtual team spaces) as is described herein, structured source data collections (such as structured source data 216 of FIG. 2), models of structured source data (such as models 224 of FIG. 2) and/or other collaboration data. In some embodiments, the application 622 may be arranged to operate with the program data 624 on the operating system 620 such that one or more methods or operations may be provided as described herein.

The computing device 600 may have additional features or functionality, and additional interfaces to facilitate communications between the basic configuration 602 and any involved devices and interfaces. For example, a bus/interface controller 630 may be used to facilitate communications between the basic configuration 602 and one or more data storage devices 632 via a storage interface bus 634. The data storage devices 632 may be removable storage devices 636, non-removable storage devices 638, or a combination thereof. Examples of removable storage and non-removable storage devices include magnetic disk devices such as flexible disk drives and hard-disk drives (HDDs), optical disk drives such as compact disk (CD) drives or digital versatile disk (DVD) drives, solid state drives (SSDs), and tape drives to name a few. Example computer storage media may include volatile and nonvolatile, removable and non-removable media implemented in any method or technology for storage of information, such as computer-readable instructions, data structures, program modules, or other data.

The system memory 606, the removable storage devices 636, and the non-removable storage devices 638 are examples of computer storage media or non-transitory computer-readable media. Computer storage media or non-transitory computer-readable media includes RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other non-transitory medium which may be used to store the desired information and which may be accessed by the computing device 600. Any such computer storage media or non-transitory computer-readable media may be part of the computing device 600.

The computing device 600 may also include an interface bus 640 to facilitate communication from various interface devices (e.g., output devices 642, peripheral interfaces 644, and communication devices 646) to the basic configuration 602 via the bus/interface controller 630. The output devices 642 include a graphics processing unit 648 and an audio processing unit 650, which may be configured to communicate to various external devices such as a display or speakers via one or more A/V ports 652. Diagrams, flowcharts, organizational charts, connectors, and/or other graphical objects generated by the diagram application 626 may be output through the graphics processing unit 648 to such a display. The peripheral interfaces 644 include a serial interface controller 654 or a parallel interface controller 656, which may be configured to communicate with external devices such as input devices (e.g., keyboard, mouse, pen, voice input device, touch input device, etc.), sensors, or other peripheral devices (e.g., printer, scanner, etc.) via one or more I/O ports 658. Such input devices may be operated by a user to provide input to the diagram application 626, which input may be effective to, e.g., generate curved connectors, designate points as designated points of one or more curved connectors, relocate one or more designated points, and/or to accomplish other operations within the diagram application 626. The communication devices 646 include a network controller 660, which may be arranged to facilitate communications with one or more other computing devices 662 over a network communication link via one or more communication ports 664.

The network communication link may be one example of a communication media. Communication media may typically be embodied by computer-readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR), and other wireless media. The term "computer-readable media" as used herein may include both storage media and communication media.

The computing device 600 may be implemented as a portion of a small-form factor portable (or mobile) electronic device such as a smartphone, a personal data assistant (PDA) or an application-specific device. The computing device 600 may also be implemented as a personal computer including tablet computer, laptop computer, and/or non-laptop computer configurations, or a server computer including both rack-mounted server computer and blade server computer configurations.

Embodiments described herein may be implemented using computer-readable media for carrying or having computer-executable instructions or data structures stored thereon. Such computer-readable media may be any available media that may be accessed by a general-purpose or special-purpose computer. By way of example, such computer-readable media may include non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable media.

Computer-executable instructions may include, for example, instructions and data which cause a general-purpose computer, special-purpose computer, or special-purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Unless specific arrangements described herein are mutually exclusive with one another, the various implementations described herein can be combined to enhance system functionality or to produce complementary functions. Likewise, aspects of the implementations may be implemented in standalone arrangements. Thus, the above description has been given by way of example only and modification in detail may be made within the scope of the present invention.

With respect to the use of substantially any plural or singular terms herein, those having skill in the art can translate from the plural to the singular or from the singular to the plural as is appropriate to the context or application. The various singular/plural permutations may be expressly set forth herein for sake of clarity. A reference to an element in the singular is not intended to mean "one and only one" unless specifically stated, but rather "one or more." Moreover, nothing disclosed herein is intended to be dedicated to the public regardless of whether such disclosure is explicitly recited in the above description.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that include A alone, B alone, C alone, A and B together, A and C together, B and C together, or A, B, and C together, etc.). Also, a phrase presenting two or more alternative terms, whether in the description, claims, or drawings, should be understood to include one of the terms, either of the terms, or both terms. For example, the phrase "A or B" will be understood to include the possibilities of "A" or "B" or "A and B."

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method to manage a virtual team space, the method comprising:

creating a new time period of a canvas-based space that follows an immediately prior time period of the canvas-based space, the immediately prior time period of the canvas-based space including structure, relevant content, and non-relevant content;

following and in response to creation of the new time period:

persisting the structure in the new time period of the canvas-based space;

persisting the relevant content in the new time period of the canvas-based space; and wiping the non-relevant content from the new time period of the canvas-based space; and prior to creating the new time period:

receiving first input effective to designate the relevant content as content to persist across time periods of the canvas-based space; and receiving second input effective to designate a container graphical object within which the non-relevant content is located as a container to be refreshed across time periods of the canvas-based space.

2. The method of claim 1, further comprising at least one of:

creating multiple time periods of the canvas-based space over time and providing access to each of the multiple time periods to one or more users;

saving at least some of a revision history of the new time period of the canvas-based space; or wiping non-persistent structure of the immediately prior time period of the canvas-based space from the new time period of the canvas-based space.

3. The method of claim 1, wherein:

the relevant content has a default state of persistent; or the non-relevant content has a default state of non-persistent.

4. The method of claim 1, further comprising:

displaying a team roster that represents a team including multiple team members, the team roster including multiple user icons that each represents a different one of the team members, the user icons including a given user icon that represents a given team member of the team members;

receiving input to associate the given user icon with a graphical object in the canvas-based space; and associating the given team member represented by the given user icon with the graphical object.

5. The method of claim 4, wherein at least one of:

receiving input to associate the given user icon with the graphical object comprises receiving input to drag the given user icon from the team roster and drop the given user icon on the graphical object in the canvas-based space;

associating the given team member represented by the given user icon with the graphical object comprises assigning a task associated with the graphical object to the given team member; or the method further includes adding an identifier of the given team member to the graphical object to indicate the association of the given team member with the graphical object.

6. The method of claim 1, further comprising:

providing access to the virtual team space to each team member of a team that includes multiple team members; and receiving input to designate at least one of the following as the relevant content to be persisted:

one or more decisions to be made by the team collectively or by one or more of the team members;

tasks to be completed by one or more of the team members;

a project timeline;

a set of one or more goals of the team collectively or of one or more of the team members; or a set of one or more documents used or expected to be used on a recurring basis by the team.

7. The method of claim 1, wherein the persisted structure includes at least one of:

a container graphical object; or a purpose-dedicated section.

8. The method of claim 1, wherein the persisted relevant content includes at least one of:

a sticky note graphical object;

a task graphical object;

a text box graphical object;

a graphical diagram;

a calendar;

a project timeline;

an organization chart;

an embedded document;

an embedded external website; or team resources.

9. The method of claim 1, wherein the non-relevant content includes at least one of:

a sticky note graphical object;

a task graphical object;

a text box graphical object;

a graphical diagram;

a calendar;

meeting notes;

standup notes; or completed task graphical objects.

10. The method of claim 1, further comprising:

receiving input to select a set of one or more graphical objects;

receiving input to create an embedded document of a specified type with the selected set of one or more graphical objects; and creating, in the canvas-based space, the embedded document of the specified type, the embedded document including the selected set of one or more graphical objects.

11. The method of claim 10, further comprising adding contextual content to a document preview graphical object in the canvas-based space in response to input to add the contextual content, the document preview graphical object representing the embedded document.

12. A non-transitory computer-readable storage medium having computer-executable instructions stored thereon that are executable by a processor device to perform or control performance of the method of claim 1.

13. A method to manage a virtual team space, the method comprising:

opening a template that includes at least first and second container graphical objects in a canvas-based space;

receiving first input to designate the first container graphical object as a container of content to be persisted in the canvas-based space;

receiving second input to designate the second container graphical object as a container of content to be refreshed in the canvas-based space;

receiving third input to create a new time period of the canvas-based space; and in response to creation of the new time period:

persisting structure including the first and second container graphical objects in the new time period of the canvas-based space;

persisting, in the new time period of the canvas-based space, all content within the first container graphical object based on the designation of the first container graphical object as a container of content to be persisted; and wiping all undesignated content within the second container graphical object from the new time period of the canvas-based space.

14. The method of claim 13, further comprising:

prior to receiving the third input, receiving additional input to designate first content within the second container graphical object as content to be persisted; and further following creation of the new time period, persisting, in the new time period of the canvas-based space, the first content within the second container graphical object based on the designation of the first content as content to be persisted.

15. The method of claim 13, further comprising:

prior to receiving the third input, receiving additional input to designate first content in the canvas-based space that is outside of any container graphical objects in the canvas-based space as content to be persisted; and further following creation of the new time period, persisting, in the new time period of the canvas-based space, the first content that is outside of any of the container graphical objects based on the designation of the first content as content to be persisted.

16. The method of claim 13, wherein the template is a first template, the method further comprising, opening a second template in the canvas-based space such that both the first template and the second template are simultaneously open in the canvas-based space at different locations.

17. The method of claim 13, further comprising, associating a first team member with a graphical object in the virtual team space, the first team member being a member of a team that has access to the virtual team space, in response to receiving input to drag and drop a first user icon that represents the first team member from a team roster onto the graphical object, the team roster including a different user icon for each team member of the team.

18. The method of claim 13, further comprising:

receiving input to embed a document of a specified type into the canvas-based space;

embedding, in the canvas-based space, the document of the specified type;

adding contextual content to a document preview graphical object in the canvas-based space in response to input to add the contextual content, the document preview graphical object representing the embedded document; and displaying the added contextual content in the document preview graphical object.

19. A non-transitory computer-readable storage medium having computer-executable instructions stored thereon that are executable by a processor device to perform or control performance of the method of claim 13.

* * * * *